(12) United States Patent
Singer et al.

(10) Patent No.: US 6,557,009 B1
(45) Date of Patent: Apr. 29, 2003

(54) ENVIRONMENTAL PERMIT WEB PORTAL WITH DATA VALIDATION CAPABILITIES

(75) Inventors: Gary Brian Singer, Ann Arbor, MI (US); Jeffrey Neal Adams, Alexandria, VA (US); Clay Wyatt Goldwein, McLean, VA (US)

(73) Assignee: American Management Systems, Inc., Fairfax, VA (US)

( * ) Notice: Subject to any disclaimer, the term of this patent is extended or adjusted under 35 U.S.C. 154(b) by 0 days.

(21) Appl. No.: 09/654,515

(22) Filed: Sep. 1, 2000

(51) Int. Cl.[7] .............................................. G06F 17/00
(52) U.S. Cl. ................... 707/104.1; 707/10; 707/102; 707/513; 705/7; 709/218
(58) Field of Search ................ 707/1–4, 9, 10, 707/104.1, 501, 513; 705/1, 7, 9, 11, 28; 709/217–219

(56) References Cited

U.S. PATENT DOCUMENTS

| | | | |
|---|---|---|---|
| 5,291,398 A | 3/1994 | Hagan | 364/408 |
| 5,532,928 A | 7/1996 | Stancyzk et al. | 235/376 |
| 5,631,828 A | 5/1997 | Hagan | 395/204 |
| 5,664,112 A | 9/1997 | Sturgeon | 700/95 |
| 5,726,884 A | 3/1998 | Sturgeon et al. | 340/915 |
| 5,765,140 A | 6/1998 | Knudson et al. | 705/9 |
| 5,793,636 A | 8/1998 | Cooney et al. | 376/260 |
| 5,808,916 A | 9/1998 | Orr et al. | 703/6 |
| 5,864,685 A | 1/1999 | Hagan | 395/235 |
| 5,890,129 A | 3/1999 | Spurgeon | 705/2 |
| 6,067,549 A * | 5/2000 | Smalley et al. | 707/104 |
| 6,085,976 A * | 7/2000 | Sehr | 235/384 |
| 6,088,700 A * | 7/2000 | Larsen et al. | 707/10 |
| 6,091,835 A * | 7/2000 | Smithies et al. | 382/115 |
| 6,122,635 A * | 9/2000 | Burakoff et al. | 707/102 |
| 6,256,640 B1 * | 7/2001 | Smalley et al. | 707/104 |
| 6,260,044 B1 * | 7/2001 | Nagral et al. | 707/102 |

OTHER PUBLICATIONS

"A Broker for Tracking, Delivering and Using Regulations Over The World Wide Web," Stasiak et al., Proceedings of the 1996 IEEE International Symposium on Electronic and the Environment, May 6–8, 1996, pp. –293–297.*

Information Technolopgy Seen Key to Cutting New Nuclear Plant Costs, Nucleonics Week, vol. 41, No. 16, P. 2, Apr. 20, 2000.

(List continued on next page.)

*Primary Examiner*—Hosain T. Alam
(74) *Attorney, Agent, or Firm*—Staas & Halsey LLP

(57) ABSTRACT

A system is disclosed that allows remote, regulated entity users web based access to authorization data, such as permit data in an environmental regulatory permitting or management system. The user can enter, edit and submit permit and compliance data in the environmental permitting system controlled by a regulating agency in real-time via a web browser over the Internet. The system can also validate submitted information in real-time and allows the user to correct the data. Electronic certification with a unique signature is also performed. Fee payment can be made electronically in real-time through the permitting system with an electronic payments system with a corresponding credit being made to the relevant department general ledger account.

54 Claims, 30 Drawing Sheets

OTHER PUBLICATIONS

Portable Maintenance, Dilger, Karen Abramic, Manufacturing System, vol. 15, No. 12, pp. 20–22, Dec. 1997.

Pen PC's Power Gas Company, John Longwell, Computer Reseller News, No. 628, pp. S15–S161. May 1995.

Computerized Applications in Composting and Recycling. David Riggle, Biocycle, vol. 43, No. 3, pp. 60–63, Mar. 1993.

Ending the Method 21 Paper Chase. Environmental Solutions, pp. 30, Jun. 1996.

Health and Safety Inspect Software Developed for Badger Ruggedized Handheld Computers. News Release, Mar. 14, 1994.

Improve Portable Monitor Selection. S Hennigan et al., Hydrocarbon Processing, vol. 74, No. 2, pp. 75(8) Feb. 1995.

The Age of Aquarius: Wetlands Take Center Stage. Beth Wade, American City & Country, vol. 109, No. 12, pp. 50(8), Nov. 1994.

"Grant Application & Management System—Version 6.01.95", North Carolina State University, pp. 12–29, Jun. 1995.

PDSI to Offer Maximo® Wireless in Jun. 1999. PR Newswire Boston, Mar. 15, 1999.

Wireless IP—A Case Study. Peter Rysavy, Rysavy Research for PCS Data Today online journal, Apr. 30, 1999.

Touring NPEM 1999: Information Technologies for Maintenance Management Show Promise, Innovation. Tom Singer, Tompkins Associates, Inc., Plant Engineering Magazine, May 1, 1999.

Penning Vertical Software. VARBusiness, Jun. 1994 pp. 173 by Katherine Bull.

Badger sets sights on VARs to sell "rugged" computers. Computer Reseller News, Oct. 25, 1993, p. 124 by Eric Hausman.

SPARS –State Permitting and Air Reporting System, "How Will Electronic Permitting Help Industry, Citizens and the DNR?"http://www.dnraq.state.ia.us/spars pages/help.htm Date unknown.

SPARS –State Permitting and Air Reporting System, "SPARS Frequently Asked Questions (FAQ)", http://www.dnraq.state.ia.us/spars pages/faq.htm Date unknown.

SPARS –State Permitting and Air Reporting System, SQL Anywhere User's Guide, Version 2.07 by Windsor Technologies, Inc. for the Iowa Department of Natural Resources. Jul. 23, 2001.

Georgia Tech Video: Integrated Optic Sensor May Soon Revolutionize Chemical Testing. Optical Materials & Engineering News, vol. 4, No. 2, Oct. 1993.

* cited by examiner

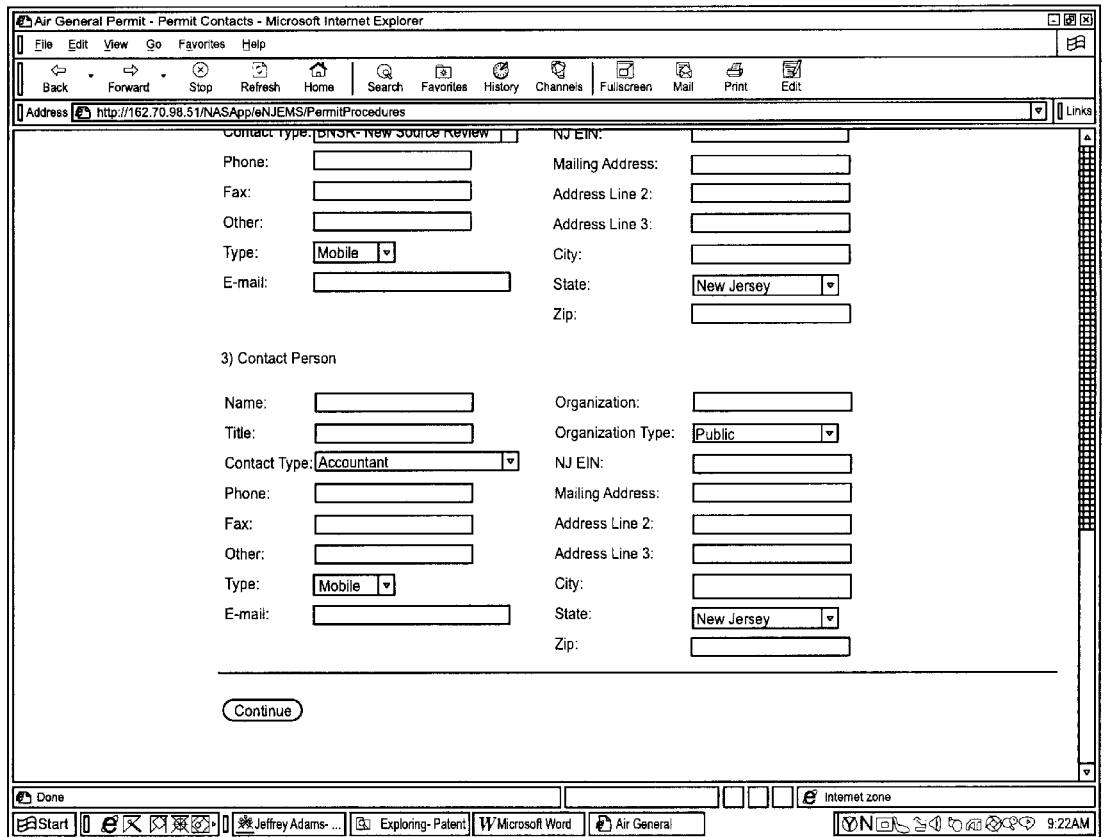
FIG. 3Cii

FIG. 3Ciii

NEW JERSEY DEPARTMENT OF ENVIRONMENTAL PROTECTION

AIR QUALITY PERMITTING

GENERAL PERMIT REGISTRATION FORM

BULK SOLID MATERIALS RECEIVING AND STORAGE SYSTEMS

SECTION A: FACILITY PROFILE

Facility ID Number: 40009       Facility Name: MERCK & CO., INC.

Street Address       Mailing Instructions and Information:
Address Line 1: 126 EAST LINCOLN AVE
Address Line 2:       Mail Registration Form & Fee to:
Address Line 3:       NJDEP - Air Quality Permitting Program
City: RAHWAY   State: NJ   ZIP:       P.O. Box 27
      Trenton, New Jersey 08625

Mailing Address
Address Line I: P O BOX 2000 R7-30       Fee Amount: $250
Address Line 2:       Make Checks Payable to "Treasurer, State of NJ"
Address Line 3:
City: RAHWAY   State: NJ   ZIP: 07065       For Assistance, Please call:
      (800) 441-0065 within NJ
County       (609) 292-6716 outside NJ
County Where Facility is Located: Union Location Description       Industry Information
Facility entrance is located next to the ExxonMobil gas station. Main plant is .5       Primary SIC: 2833
miles down on Merck Drive on the left. Visitor parking is located in the front.       Secondary SIC:

Facility Contact
Contact Person
Name: WM TOTORIELLO  Organization: MERCK & CO INC
Title:  Organization Type: Corporation
Contact Type: BNSR- New Source Review  NJ EIN:
Phone: 9085945361  Mailing Address: PO BOX 2000
Fax:  Address Line 2:
Other:  Address Line 3:
Type: Mobile  City: RAHWAY  State: NJ  Zip: 07065
E-Mail:

SECTION B: REASON FOR APPLYING

☑ Unpermitted (new equipment or existing unpermitted equipment)
☐ Permitted (modification or replacement of existing pieces of equipment currently listed on an effective NJDEP permit)

SECTION C: EQUIPMENT INVENTORY

| NJID # | Facility Designation | Facility Description |
|---|---|---|
| E-1 | Bulk Ex. A | Bulk Ex. A |
| NJID # | Facility Designation | Facility Description |
| CD-3 | Bulk Ex. A | Bulk Ex. A |
| NJID # | Facility Designation | Facility Description |
| U-1 | Bulk Ex. A | Bulk Ex. A |
| NJID # | Facility Designation | Facility Description |
| PT-1 | Bulk Ex. A | Bulk Ex. A |

| NJID # | Facility Designation | Facility Description |
|---|---|---|
| E-1 | Bulk Ex. A | Bulk Ex. A |
| NJID # | Facility Designation | Facility Description |
| CD-3 | Bulk Ex. A | Bulk Ex. A |
| NJID # | Facility Designation | Facility Description |
| U-1 | Bulk Ex. A | Bulk Ex. A |
| NJID # | Facility Designation | Facility Description |
| PT-1 | Bulk Ex. A | Bulk Ex. A |

SECTION D: Permitting Scenarios
Registration under this General Permit is for single or multiple pieces of bulk solid materials receiving and storage equipment which connect to single or multiple control devices venting to one or more common stacks. (Note: See instructions for example and illustrations.)

SECTION E: Certification
"I certify under penalty of law that I believe the information provided in this document is true, accurate, and complete. I am aware that there are significant civil and criminal penalties, including the possibility of fine or imprisonment or both, for submitting false, inaccurate or incomplete information."

Individual with Direct Knowledge           Date

"I certify under penalty of law that I have personally examined and am familiar with the information submitted in this document and all attached documents and, based on my inquiry of those individuals immediately responsible for the obtaining the information, I believe that the submitted information is true, accurate and complete. I am aware that there are significant civil and criminal penalties, including the possibility of fine or imprisonment or both, for submitting false, inaccurate or incomplete information."

Name of Responsible Official           Date ( Modify Permit )    ( Back to Application Folder )

FIG. 3Diii

FIG. 3Ei

Individual Certification for MERCK & CO., INC.

Check the permits that you wish to certify, then complete Section E below.

| Select | Facility Designation | Permit Type | Creation Date |
|---|---|---|---|
| ☐ | Bulk Ex A | Bulk Solid | 08-01-2000 |
| ☐ | Bulk Ex B | Bulk Solid | 08-01-2000 |
| ☐ | Bulk Ex C | Bulk Solid | 08-01-2000 |

SECTION E: Certification of the Individual with Direct Knowledge

"I certify under penalty of law that I believe the information provided in this document is true, accurate, and complete. I am aware that there are significant civil and criminal penalties, including the possibility of fine or imprisonment or both, for submitting false, inaccurate or incomplete information."

Name of Certifying Party: KCOOPER
* Personal Identification Number: [ ]

( Certify )

Certification of your PIN constitutes an electronic signature of this Air General Permit in accordance with the aforementioned statement.

You will not receive written confirmation from the State of New Jersey as evidence of your Online General Permit Application. It is recommended that you print a copy of your permit application and retain a copy of this Certification/Verification Document for your records. NOTE: If you wish to review and print any of the General Permits "in progress" you may click on the highlighted Facility Designation and you will be brought to the completed application that you may print out using your browser's print capabilities.

Sidebar:
- Identification
  - Edit User Profile
  - Change PIN
  - Request Air Program New Facility ID/PIN
  - SRP Responsible Official Form
- Guidance Documents
  - General Procedures
  - GP-001 Bulk Solid
  - GP-002 Abrasive Blasting
  - GP-003 Woodworking
  - GP-004 Fuel Station
  - GP-005 Emergency Gen.
  - GP-006 Boiler
  - GP-007 VOC Storage Tanks
  - GP-008 Site Remediation
- Permit Tools
  - Edit Facility Profile
  - Application Folder
  - Permit/Certificate Folder
  - Create New Permit
- Certification
  - Individual w/Knowledge
  - Responsible Party
- Payments
  - Payment
- General
  - NJDEP Program Selection
  - DEP Home
  - Help
  - Logout

210

FIG. 3Eii

NJ DEP EXCESS EMISSIONS REPORT

MERCK & CO INC

VI. CMS EXCURSIONS

EMISSION EXCEEDANCE INFORMATION

| 1 EXCEEDANCE DATE/TIME | | 2 EMISSION OR PARAMETER | 3 PERMIT ALLOWABLE | | 4 UNITS | 5 AVERAGING TIME | 6 DURATION (HRS) | 7 EMISSION OR PARAMETER READING |
|---|---|---|---|---|---|---|---|---|
| START | END | | LOWER BOUND | UPPER BOUND | | | | |
| | | | | | | | 0:00 | |
| | | | | | | | 0:00 | |
| | | | | | | | 0:00 | |
| | | | | | | | 0:00 | |
| | | | | | | | 0:00 | |
| | | | | | | | 0:00 | |

| 8 PERCENT DEVIATION FROM ALLOWABLE | 9 REMARKS |
|---|---|
| | |
| | |
| | |
| | |
| | |
| | |

| | | | | | | | |
|---|---|---|---|---|---|---|---|
| | E 1 | 4 | Acetamide | Acme | AJ-999 | 4 | Monitor Comment Test |
| | E 1 | 5 | CO | Acme | AJ-657 | 13567 | Monitor Comment Test |
| | E 1 | 6 | Butane | Acme | AJ-999 | 1234 | Monitor Comment Test |
| | E 1 | 7 | carbon dioxi | Acme | AJ-657 | 151235 | Monitor Comment Test |
| | E 1 | 8 | Nitrogenoxid | Acme | AJ-657 | 14231234 | Monitor Comment Test |
| | E 1 | 9 | SO2 | Acme | AJ-999 | 141234234 | Monitor Comment Test |
| ☐ | E 2 | 1 | CO | Acme | AJ-657 | 123456 | Monitor Comment Test |
| | E 2 | 2 | carbon dioxi | Acme | AJ-657 | 6543321 | Monitor Comment Test |
| | E 2 | 3 | NOx | Acme | AJ-999 | 7654321 | Monitor Comment Test |
| | E 2 | 4 | SO2 | Acme | AJ-999 | 1234567 | Monitor Comment Test |
| | E 2 | 5 | VOC | Acme | AJ-657 | 123456 | Monitor Comment Test |
| ☐ | FC0 | 1 | Acetaldehyde | Acme | AJ-999 | 12344353245 | asfds |
| | FC0 | 2 | Acetaldehyde | Acme | AJ-657 | 43544444 | 4334 |
| | FC0 | 4 | Acetamide | Acme | AJ-657 | 4 | |

Excess Emission Report Spreadsheet Inbox for MERCK & CO INC

| Spreadsheet ID | Status | Subject Item | Year, Quarter | Creation Date |
|---|---|---|---|---|
| ⊙ 292049 | Spreadsheet Created | FC0 | 2000, Q2 | 05-15-2000 |
| ○ 292079 | Spreadsheet Created | FC0 | 2000, Q2 | 05-15-2000 |
| ○ 292142 | Spreadsheet Created | FC0 | 2004, Q1 | 05-16-2000 |

(Download)

*The spreadsheets that are downloaded from this page contain macros which were created by the State of New Jersey Department of Environmental Protection. When the spreadsheet is opened, you will be prompted to choose whether or not to enable the macros. The macros must be enabled in order for the spreadsheet to function properly.

ENVIRONMENTAL PERMIT WEB PORTAL WITH DATA VALIDATION CAPABILITIES

CROSS REFERENCE TO RELATED APPLICATIONS

This application is related to U.S. application entitled System For Managing Regulated Entities having Ser. No. 09/528,718 by Smalley et. al, filed Mar. 20, 2000 and U.S. Pat. No. 6,067,549 both incorporated by reference herein.

BACKGROUND OF THE INVENTION

1. Field of the Invention

The present invention is directed to providing Internet access to and a data entry path for an environmental permitting, compliance, submittal, and enforcement system by remote users, such as regulated entities or regulating agency personnel and, more particularly, to a system allowing users to create, select, edit, complete, certify and pay for environmental permits, reports, registrations, questionnaires, surveys, certificates, applications as well to submit encrypted supporting electronic files and access to real-time facility-level and/or user-specific regulatory data.

2. Description of the Related Art

Compliance with environmental regulations by regulated parties has traditionally been a time consuming and tedious task. Prior systems and business processes particularly required complex paper forms, disparate review prior to submission, inaccurate manual data entry, numerous instructional or data-clarifying phone calls and often the exchange of re-submittal forms between regulated facilities and regulating agencies. While some compliance tracking software was located on remote PCs it was not electronically linked to other facilities or to the regulating agencies. Nor was there a central repository of real-time data that allowed browser independent web access from any client machine, whether at a regulated facility or at a regulatory entity.

What is needed is a system in which savings in both time and expense can be realized. For the regulators, administrative tasks previously done manually need to be automated, eliminating time-consuming processing and phone calls between entities. For the regulated, the industrial facilities' representatives need the ability to enter data for permits, reports, registrations, questionnaires, surveys, certificates and applications, including automated data validation, electronic signature and payment to thereby reduce data entry, processing costs, increase compliance, allow immediate agency approval and allow real-time management of a facility's compliance with applicable regulatory requirements. In addition, both regulators and the regulated need to manage environmental compliance in a proactive and timely manner through the utilization of advanced automated electronic messaging of upcoming compliance dates and the delivery of environmental documents for immediate review.

SUMMARY OF THE INVENTION

It is an object of the present invention to provide a system that allows users to access an environmental regulatory system over the Internet.

It is another object of the present invention to provide regulated users with a system that provides secure access and certification of facility-level and user-specific data through the automated administration of unique user identifications (user ID's) and encrypted personal identification numbers (PINs).

It is also an object of the present invention to provide regulated users with a system that provides secure access to edit centralized facility-level data that is used across electronic environmental submittals.

It is also an object of the present invention to provide regulated users with a system that provides secure access to edit electronic environmental submittals for a facility or facilities which are associated with the creating user.

It is another object of the present invention to allow users to create, select, edit, complete, certify and pay for initial, modified and renewed environmental permits, reports, registrations, questionnaires, surveys, certificates and applications.

It is also an object of the present invention to allow users to print completed or agency-awarded environmental permits, reports, registrations, questionnaires, surveys, certificates and applications for hard-copy records.

It is an object of this invention to facilitate more rapid decision making by regulatory agencies by allowing virtually instant access to data submitted by regulated entities.

It is a further object of the present invention to provide industrial entities with the ability to request and download partially pre-filled supporting electronic files for completion on the remote user's PC desktop.

It is an additional other object of the present invention to provide regulated users with the ability to validate, electronically lock and upload a read-only supporting electronic file, such as a spread-sheet, via the environmental regulatory web portal and for agency review.

It is another object of the present invention to provide regulated users with a streamlined workflow through the ability to remotely certify and pay for one or many environmental submittals at a time.

It is another object of the present invention to facilitate proactive environmental compliance management, regulator to regulated communication and timely submittal review through automated electronic messaging.

It is an additional object of the present invention to provide a central joint repository of real-time data that allows browser independent web access from any client machine, both for the regulator and the regulated.

The above objects can be attained by a system that allows remote regulated entity users to access, enter, edit and submit compliance data into an enterprise wide environmental management system of a regulating agency in real-time via a web browser over the Internet. The system can also validate submitted information in real-time. Submittal certification and fee payment can also be made electronically in real-time with a corresponding credit being made to the relevant facility-level account and corresponding general ledger account within the associated government financial system.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 depicts a facility profile screen which can be used to enter or update facility information that is used across electronic environmental submittals.

FIGS. 5A and 5B depict a spread sheet that can be submitted.

FIGS. 7A and 7B depict Internet application screens used for the downloading and uploading of supporting electronic files, such as a spread-sheet.

DESCRIPTION OF THE PREFERRED EMBODIMENTS

Figure 1:
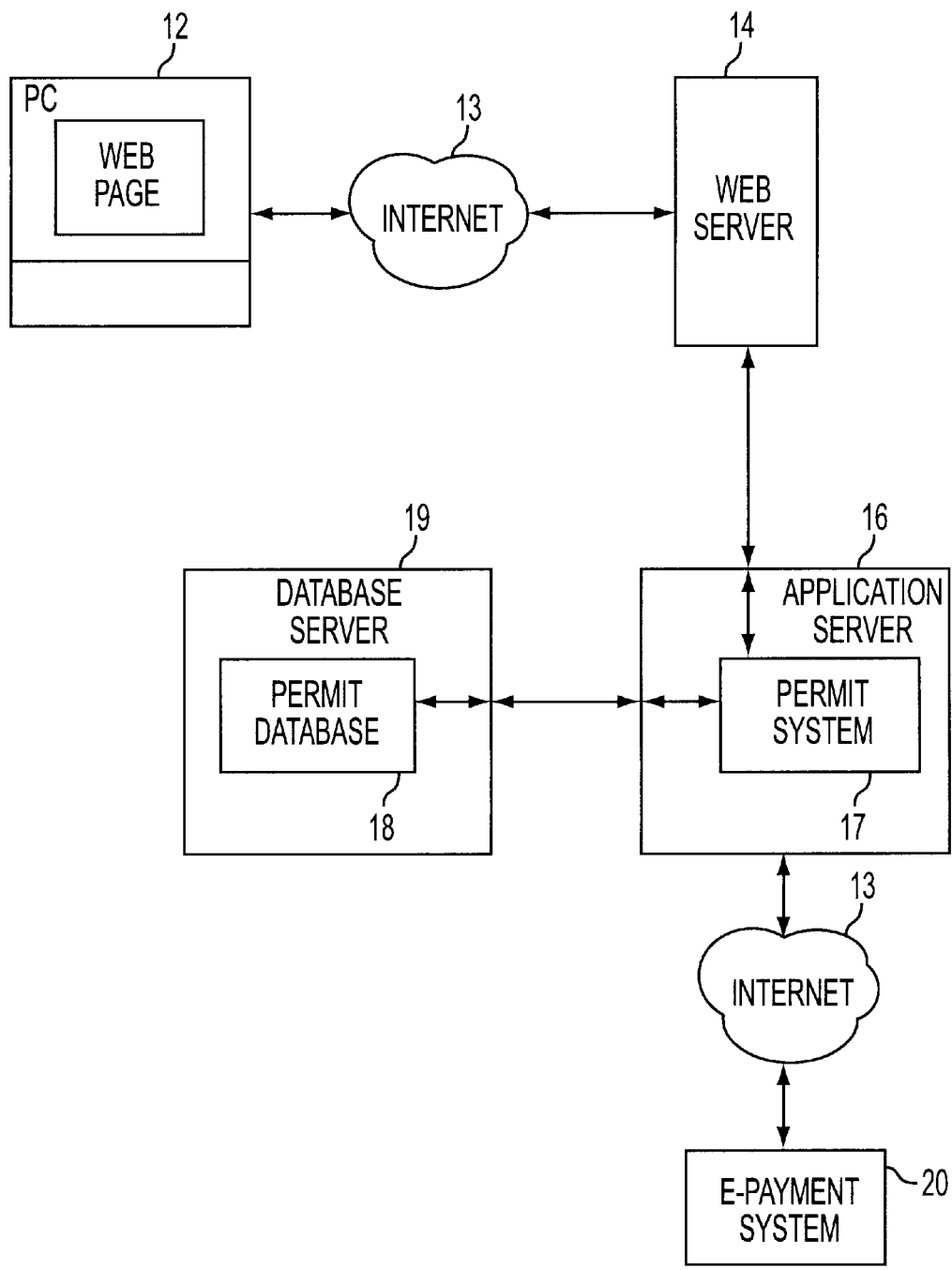
FIG. 1 illustrates the components of the system architecture of the present invention.
Figure 2A:
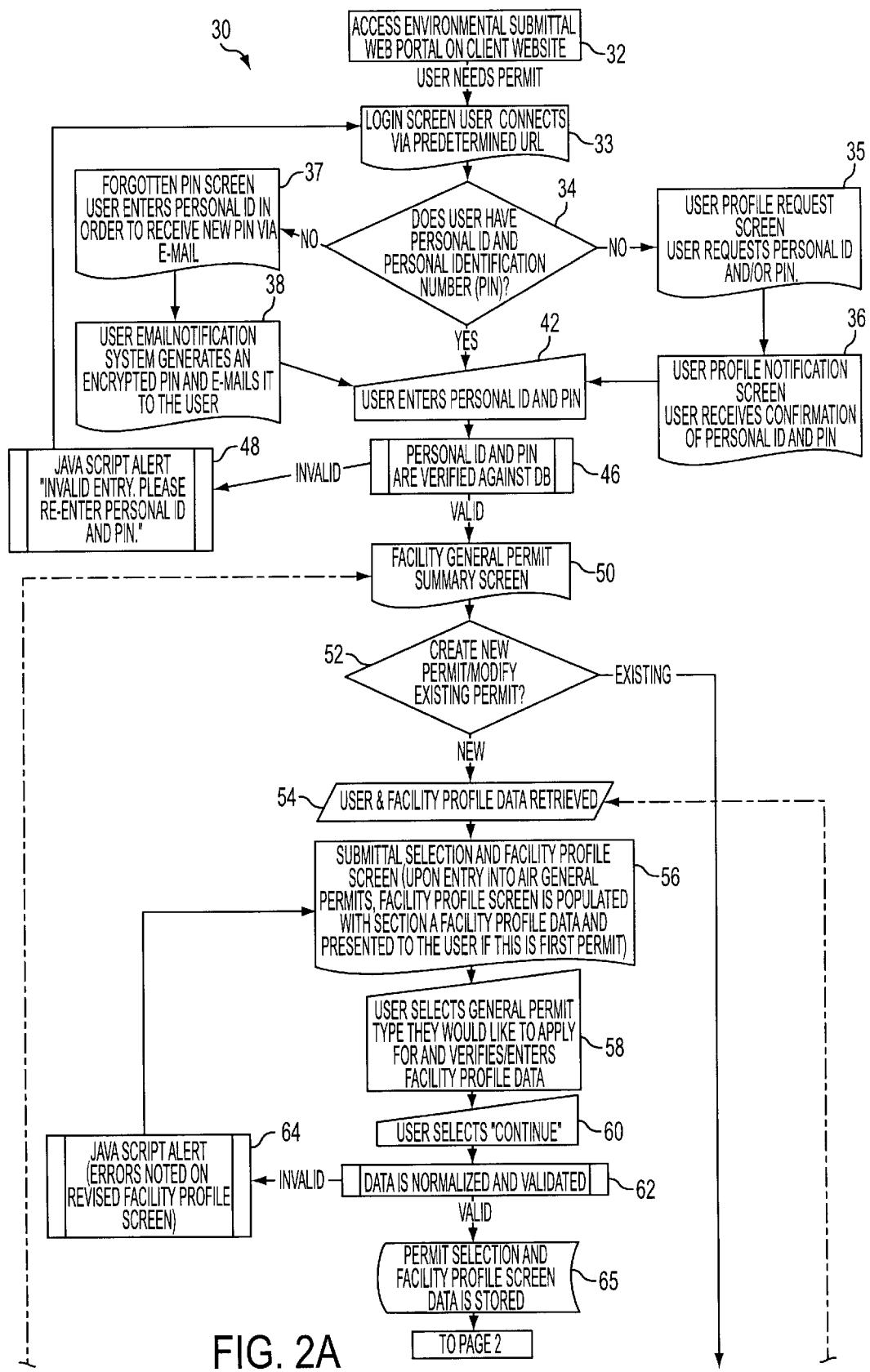
FIGS. 2A–2D depict the flow of operations performed in one aspect of the environmental submission process of the present invention.
Figure 2B:
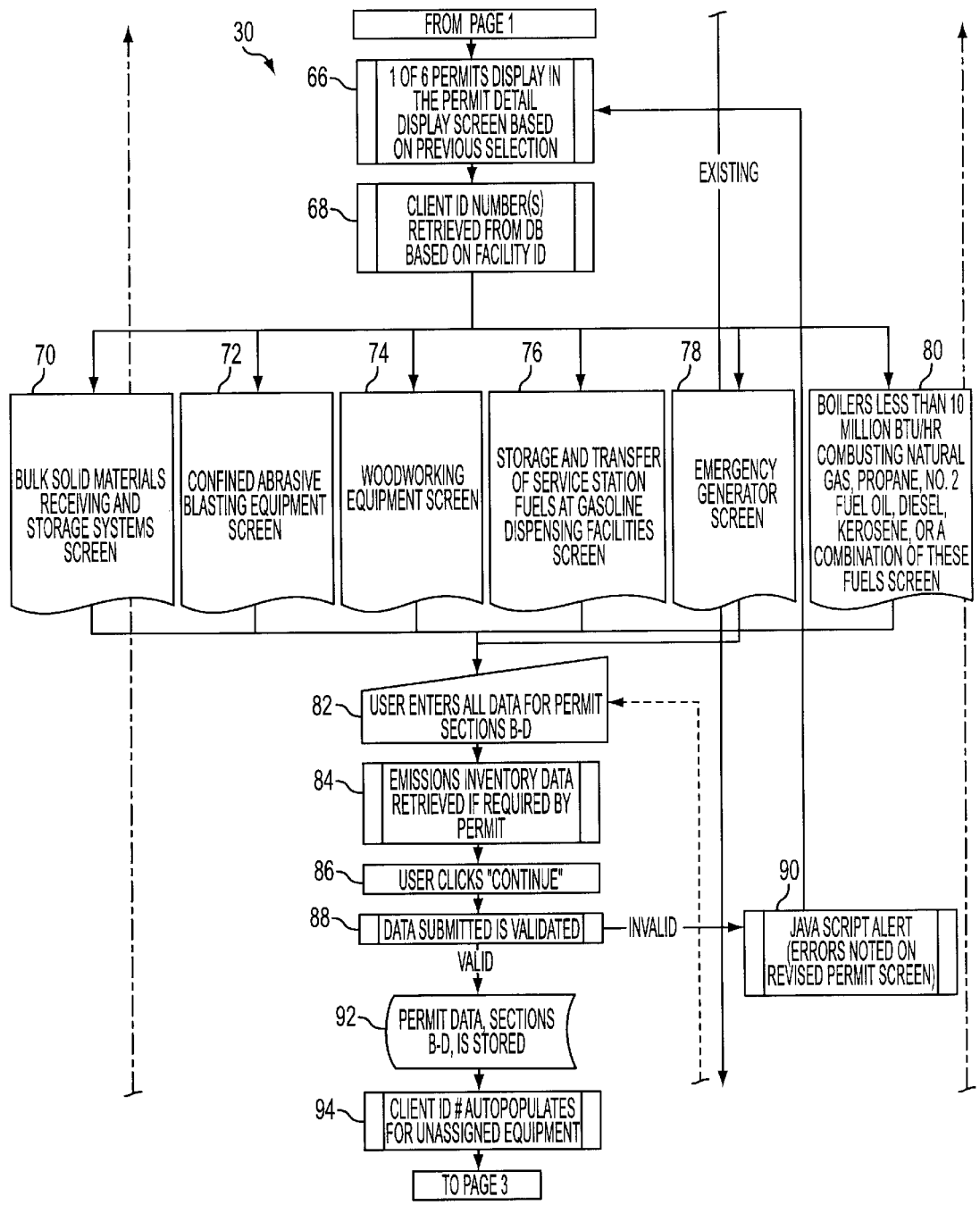
Figure 2C:
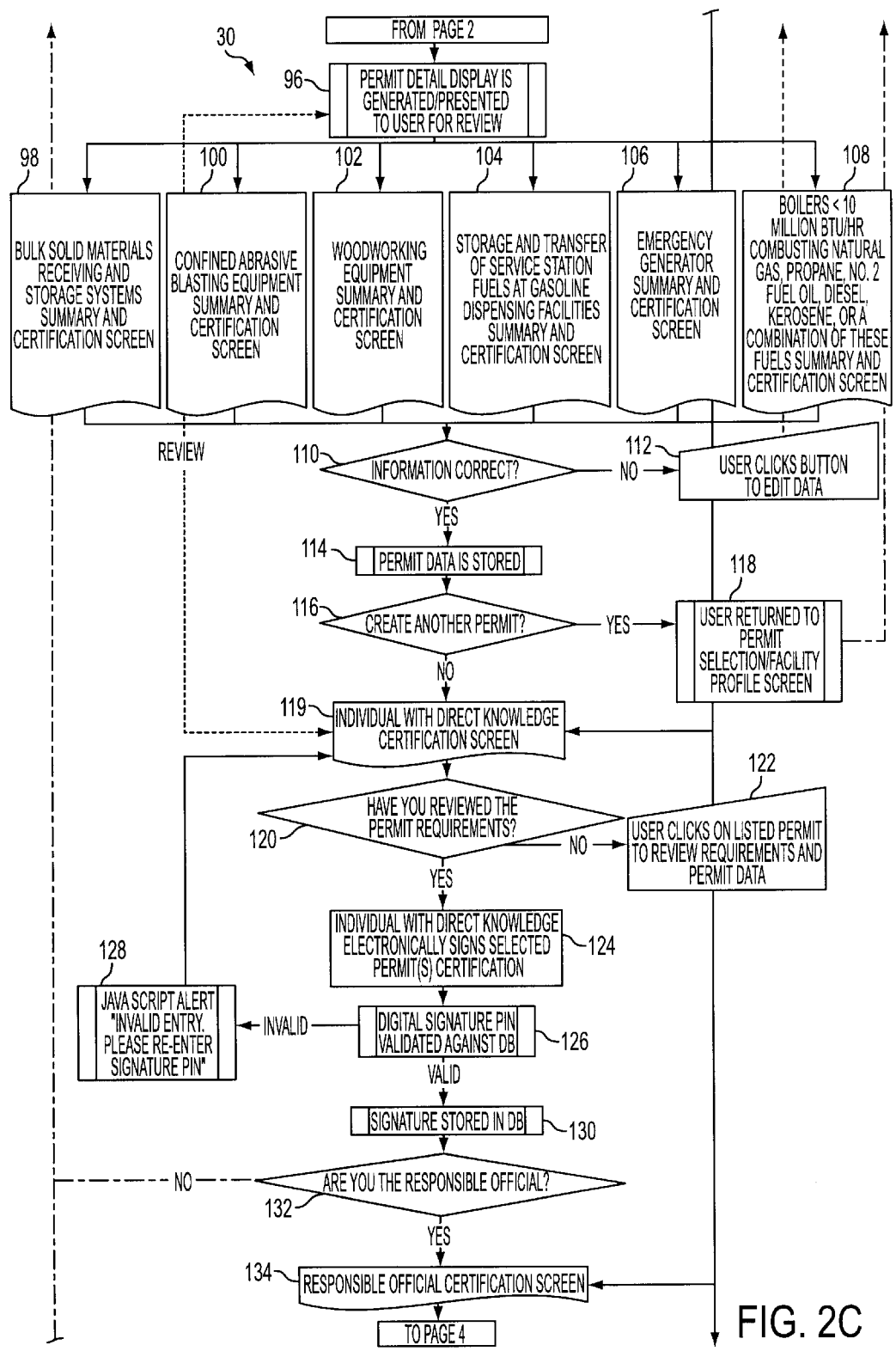
Figure 2D:
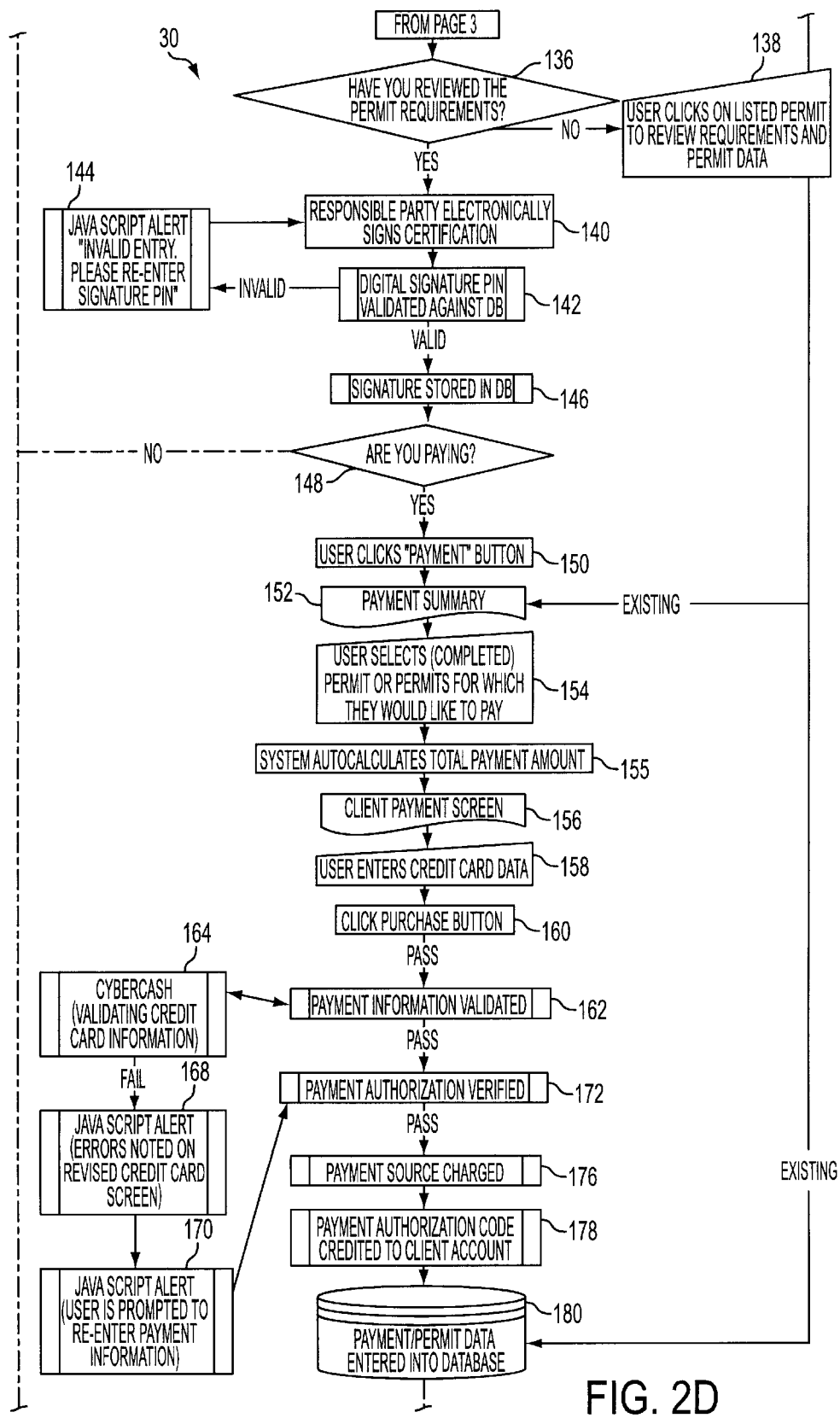

The present invention provides heightened, real-time communication between regulated facilities and the Federal, State, Regional, and Local Governmental organizations which have legal regulatory authority over these facilities. The invention allows regulated users to remotely access, create, digitally certify, electronically pay for and submit a permit, report, registration, questionnaire, survey, certificate and application for immediate compliance evaluation and approval. For both the regulated and the regulators the tool of this invention also allows access to the most current, up-to-date compliance and electronic submittal status information both at the facility and state levels. The system of the invention includes an environmental management system storing authorization data and a remote access system couplable to the management system allowing a recipient of an authorization remote access to the authorization data. The authorization data includes both submittals from the authorization recipient, as well as the data the authorizing organization has on-file. Authorization data includes one or more of the following: Permit/Registration Application Data; Registration Data; Questionnaire Data; Survey Data; Certificate Data; Sample Measurements, including both aggregate data (i.e., monthly averages), as well as individual sample results; Equipment Inventory Lists; Equipment Maintenance Records; Locational Data; Personnel Lists (including roles, responsibilities, licenses-held, and contact information); Compliance Data (including historical trend data); Financial Data (including bills and invoices for authorizations and penalties); Compliance Schedule Data (i.e., a list of due dates for submittals, renewals, inspections); Continuing Education Data (i.e., courses taken, certifications held); Site Plans (i.e., facility diagrams, CAD drawings); Emergency Response Plans; and Inspection Checklists and Results.

A purpose of the tool of the present invention is to streamline the transfer of data and compliance documents between regulators and their regulated clients. By using this tool, facilities will achieve increased efficiency as a result of reduced administrative time and costs, as well as increased data accuracy through on-line updating. Compliance should increase, and response time decrease by transmitting data on-line. The burden on the state and federal agencies to reply to clients via phone and paper will be drastically reduced, while their review process will be enhanced due to on-line, real-time access to current, accurate client data. The time required to issue permits will be drastically reduced by eliminating reliance on paperwork and personal interaction.

Underlying the workflow, data entry and data access capabilities of this tool is the ability of a user to create unique User IDs and Personal Identification Numbers (PINs), which is encrypted, for each client to ensure secure access, digital certification and data integrity. Users can be limited to certain functions via the PIN. For example, only certain individuals can be granted permission to certify a permit. While agencies will have access to a facility's submitted data, they will not have the ability to alter that data in any way. The read-only status is achieved in two ways. First, the submitted electronic data is validated and migrated into the enterprise wide environmental management system of the regulating agency as locked data. Second, the supporting electronic files, such as a spread-sheet, is validated and locked on the regulated user's PC. The regulated user is provided a unique PIN allowing only regulated user access to edit and upload this supporting electronic file.

One of the purposes of the present invention is to streamline the entry and transfer of data relating to compliance documents between regulators and their regulated clients. To assist clients with an easy, quick way to update their facility "cover sheets" (e.g., name, address, contacts) that are included in every type of submittal or application, the invention includes a central repository for such facility profile level data. Therefore, a facility need only go to one place to update profile information, ensuring that the most accurate, up-to-date information is disseminated to other industry representatives at a facility and this current information is utilized across electronic submittals. This is also an effective time-saver, as the information need only be updated once each time a change is required.

Other important features of this tool, described later herein, include a complete document processing life cycle on-line through a web-browser, real-time submittals to live production databases and on-line renewals of environmental compliance documents, including certification and payment.

Additional important features include proactive environmental compliance communication and management through automated electronic messaging. For example, the system automatically sends an electronic message to a facility representative with upcoming key expiration dates, renewal fees and renewal instructions. Additionally, the system automatically reminds a user through electronic messaging when they have failed to submit the legally mandated supporting documents such as a hard-copy of a facility site plan. Facilities can also correspond with the agencies via the web and the resulting distribution of an electronic message to an agency representative to share information regarding facility data that is necessary to finalize prior to the submission of a submittal for a new facility.

The ability to include payment with on-line permit renewal is important, as it utilizes the use of electronic signature and bank authorization, thereby eliminating paperwork and time lags inherent in a paper system. Not only is the electronic signature unique, but it can be used in a very time-effective manner by allowing multiple approvals and payment by an approver at one time. Payment is achieved through a system interface with a payment system, such as that provided by CyberCash, Inc. of Virginia, which executes electronic payment transactions with a credit card authorization company.

The ability to submit electronic files in support of data entered over the web is important, as it utilizes central repository to data to jumpstart a submittal, but it also provides a regulated user with the ability to provide more data intensive submittals in a manner that is secure from manipulation by a regulatory agency prior to final submission. Through this tool, facility representatives can send requests for pre-populated files, such as excess emissions report (EERs) forms. The electronic submittal portal can then quickly generate a customized spread-sheet for each facility on demand and provide facility-level monitor and equipment data that is up-to-date. This system allows for more rapid data entry that is validated and is a quick transmission of read-only information that, when married with a facilities' ability to update all of their company data on-line at any time, ensures current information on any facility is accessible to any organization at all times. This saves the client or regulated entity valuable time previously spent completing forms manually, and eliminates possible data entry errors.

The present invention software is preferably deployed as a four-tier application system 10 as depicted in FIG. 1. Each of these tiers is described below.

In order to access the software, a permit applicant will typically use a conventional personal or desktop computer 12 located at the regulated entity site or under the regulated entity's control, and running an industry-standard web browser (either Netscape Navigator or Microsoft Internet Explorer) or a mobile or wireless device with web-browsing capability. The user interface is preferably written in HTML and implemented without using vendor-specific additions to the standard HTML to support access from as many types of browsers as possible. Although some permit applicants may have a direct connection to a packet switched network, such as the Internet 13, (via a corporate network), it is expected that many applicants will be connecting to an Internet service provider (ISP) via a modem or wireless connection. Because of the limited speed supported by most modems and wireless connections, the permits software is preferably light on graphics and other web page items that would require longer download times. To support encryption of Personal Identification Numbers (PINs) and credit card information, permit applicants use a Secure Socket Layer (SSL) connection when submitting PINs and credit card information.

A conventional web server 14, typically located at or under the control of the regulating agency, is accessible from outside of a firewall (on the Internet 13) but will have permission to communicate with the application server 16 (located inside the firewall). This web server 14 can be shared with other web sites and applications hosted by the regulating agency. The web server 14 preferably runs the Sun Solaris operating system and Netscape Enterprise Server 3.61 web server software. The web server is configured to support SSL transactions to ensure that private information, such as an applicant's PIN, is encrypted while being transmitted.

It is the job of the application server 16, typically located at or under the control of the regulating entity, to communicate between the web server 14 and a joint usage database 18 located on a database server 19. The application server 16 takes requests from users, accesses information needed by the users within the database 18 and sends that data to the web server 14 to be formatted into a web page. This web page is sent to the PC 12. All business logic for the web based environmental permitting system 17 resides in the application server 16 and in the database 18. The permitting business logic is provided by the TEMPO system available from American Management Systems, Inc of Virginia and described in the related documents noted above. The code for the access and execution logic, which will be described in more detail later herein, is preferably written using the Java programming language and supports the Java 2 Enterprise Edition (J2EE) and Enterprise Java Beans (EJB) standard. Connections from the application server 16 to the database 18 are using native Oracle (SQL*Net) drivers. The application server 16 preferably runs the Sun Solaris operating system, as well as Netscape Application Server 4.0. The application server 16 conventionally communicates with the preferred e-payment mechanism/system 20 to allow for payment of permit fees, etc. via credit cards, etc.

A database server 19 is used to facilitate storage and retrieval of all permitting information from the database 18, which is preferably an Oracle database. The database 18 stores the data of the permits as well as other regulatory information, ID information, facility related information and supporting electronic documentation, as discussed in more detail below.

Although the application server 16 and web server 14 have been depicted as being two different machines, it is possible to have web server operations and application server operations being performed in the same machine. It is also possible for the database server operations to also be included in such a multi-task machine. However, it is preferable to keep the web server distinct from other servers for security reasons.

Figure 3A:
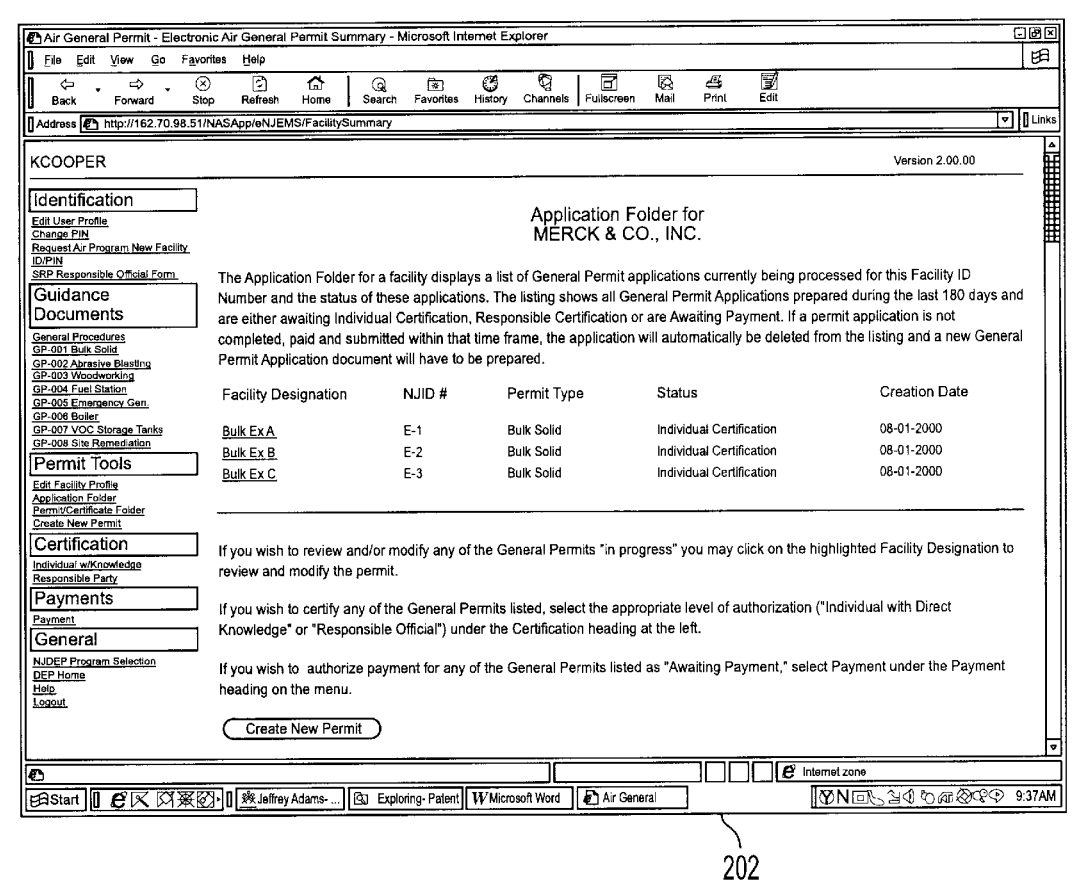

The flow of operations 30 performed in the present invention, as depicted in FIGS. 2A–2D, begins with the user accessing 32 (FIG. 2A) the permit web site using a known URL and the users conventional web browser on the PC 12 when the user needs to initiate, modify, certify or print an electronic environmental submittal. The web site returns 33 a log on screen (not shown). If the user does not have 34 a personal user ID and a personal identification number (PIN), an ID and PIN request screen is provided 35 and the appropriate identifiers are provided 36. If the user has a personal user ID but does not remember their PIN, a screen allowing the user to request the PIN is provided 37 and an e-mail message is sent 38 which includes the PIN. Each user selects their own user ID and PIN, and the system checks them for uniqueness. If the user does have a user ID, the user can enter 42 personal ID and user's PIN and submit this data. The user ID, etc. entered are conventionally passed back to the web server 14 as HTML data which conventionally is converted for use by the application server 16 which accesses the database 18 to verify 46 the IDs. If the IDs are not valid, an HTML screen is returned to the PC requesting corrective reentry of the IDs. If the IDs are valid, the application server 16 accesses the database server 19 to obtain the list of permits for the user's facility by making standard queries for this information and prepares 50 information for a permit summary screen 202 (see FIG. 3A) which is presented to the user at the PC 12 by the application server 16 through the web server 14. The web server 14 converts the screen information provided by the application server 16 into a conventional HTML web page. The user is then given 52 the opportunity to edit, certify, pay and print an existing permit or create a new permit.

Figure 3B:
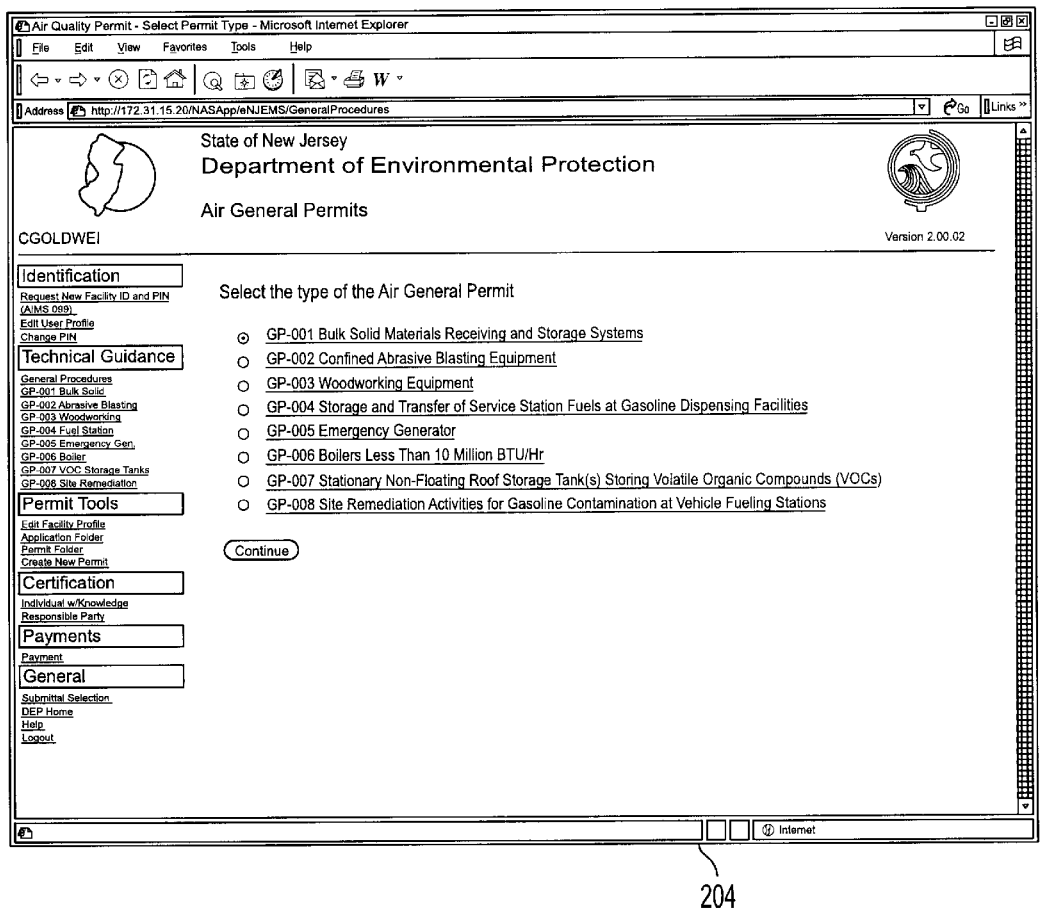
FIGS. 3A, 3B, 3Ci, 3Cii, 3Ciii, 3Civ, 3Cv, 3Di, 3Dii, 3Diii, 3Ei, 3Eii, 3F and 3G illustrate graphical user interface screen displays used in the present invention.

If the user is creating a new permit, the application server 16 accesses 54 the database server 18 for the list of valid permit types and provides 56 the PC 12 with a selection screen 204 (see FIG. 3B). The user selects 58 the type permit and enters the facility data followed by a selection 60 of the continue button. The selections of the screen are provided to the application server 16 via the web server 14 and the selection is validated. Also addresses are normalized 62 to U.S. Post Office standards. If the data entered is not valid another HTML screen is sent 64 to the PC 12 by the application that notes errors and allows reentry of the data. If the data is valid it is stored 65 in the database 18.

Figure 3:
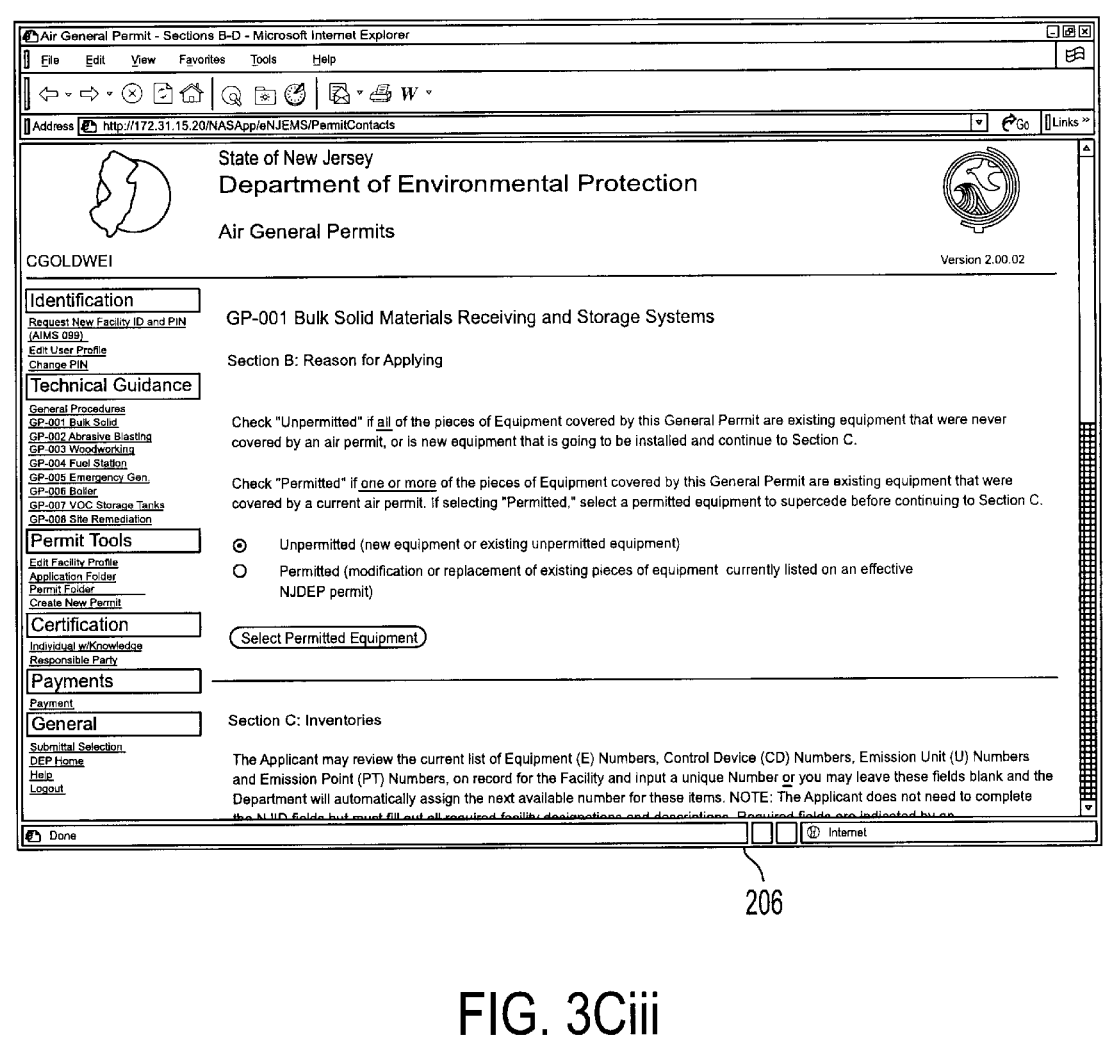
Figure 3:
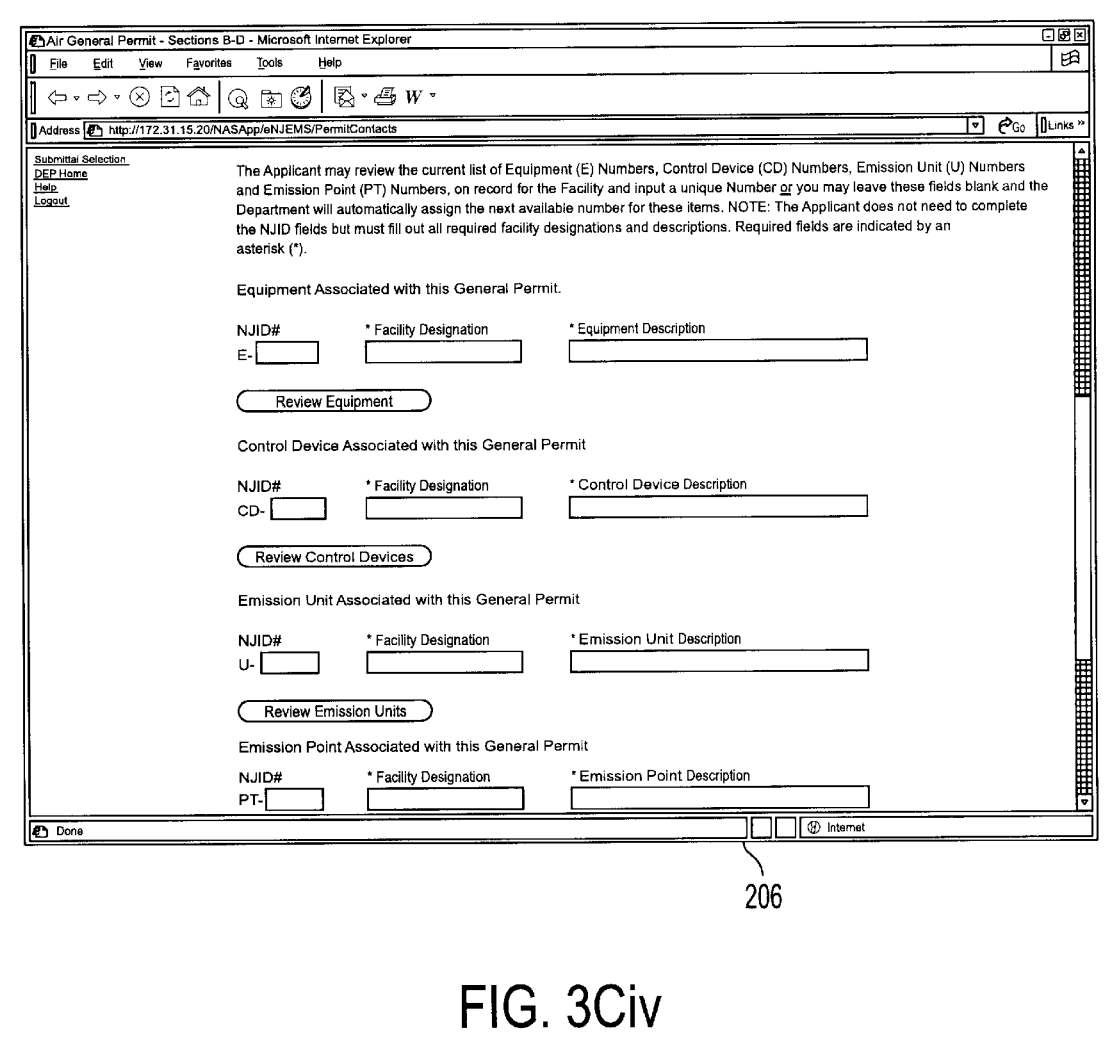

The application server 16 (see FIG. 2B) then uses the previous selection information to display 66 one of the possible permits and retrieves the facility information from the database 18. The permit data from among the types with the relevant information, is produced by the permitting system, such as TEMPO previously mentioned, and then provided (70–80) to the PC 12 via conversion into a web page. An example of the bulk solid materials receiving and storage systems permit screen 206 is shown in FIGS. 3Ci–3Cv.

The user then enters 82 the data needed for each of the sections of the permit. The system retrieves 84 the emissions data associated with the submittal being applied for and associates this emissions data with the submittal during the migration process. This data is typically fixed limitation type data that specifies the limitations/requirements within which a piece of equipment or a facility must be operated. The user may review this data on a static HTML screen (see FIGS. 3Di–3Diii) and for example, decides whether the company can abide by the permit requirements. If not, the user can exit the electronic environmental submittal and/or close the web browser. If so, the user completes any missing data then activates 86 the on screen continue button, the data is sent back to the application 17 where it is validated 88 by the system. For example, if a user initially did not provide equipment description data required by the system the application indicates that this data is missing. Once this data is provided the system then re-validates the permit data upon clicking the continue button. If all data is valid the system saves the data to the web application database. If the data is not valid a Java script in the PC 12 is activated 90 to note errors and loop back for data reentry. When the data is valid it is stored in the database 18.

Next, the screen display is automatically populated 94 with unassigned unique equipment numbers and a permit detail screen 208 is prepared 96 (see FIG. 2C) by the environmental permitting system and presented (98–108) to the user (see FIGS. 3Di–3Dii). The user, at the PC 12, reviews 110 the details of the permit and, if the data is not correct, makes edits 112 and returns to entering the permit section data 82. When the data is correct, the data is submitted and stored 114 in the database 18 by the application 17. The user can then chose 116 to create another permit and is returned 118 to the screen 204.

If the user has finished creating permits, the user is presented 119 with an individual certification screen 210 (see FIG. 3Ei). The system, prepares this screen by determining from the database all of the uncertified permits (in this user's certification queue) that this user has created but which have not been certified. The user can also conventionally get to this screen directly via the menu on the left side of the screen. From this screen the user can also select 120 to review 122 one or more permits. Upon completion of the review 122 the user can re-enter the certification workflow via the menu on the left hand side of the screen. If the user has reviewed the permit and desires to certify this permit (or permits), the user enters the PIN electronically signing 124 the permit and submits the certification. The system then validates 126 at the application server level based on the signature using the database 18 to compare the entered PIN with valid PINs stored in the database 18 and initiates 128 a Java script message that indicates that it is an invalid PIN and displays the same certification screen with the PIN field highlighted to indicate an error and to allow PIN reentry. The valid signature is then stored 130 in the database for each submittal selected.

The system then queries 132 as to whether the individual is the responsible official. If so a second responsible official certification screen 212 (see FIG. 3Eii) for the official is presented showing all of the permits that are in the officials's queue. A responsible official may also access the responsible official certification screen at any point in the process through the web portal's menu. The official can select 136 (see FIG. 2D) to review 138 one or more of the permits. If the official has reviewed the permit and desires to certify it, the official enters his PIN electronically signing 140 the permit and submits the certification. The system then validates 142, at the application server level against the central data repository, the signature using the database 18 to compare the entered PIN with valid PINs stored in the database 18 and initiates 144 a Java script on the user's HTML page showing errors and allows PIN reentry. The official signature is then stored 146 in the database 18.

Figure 3F:
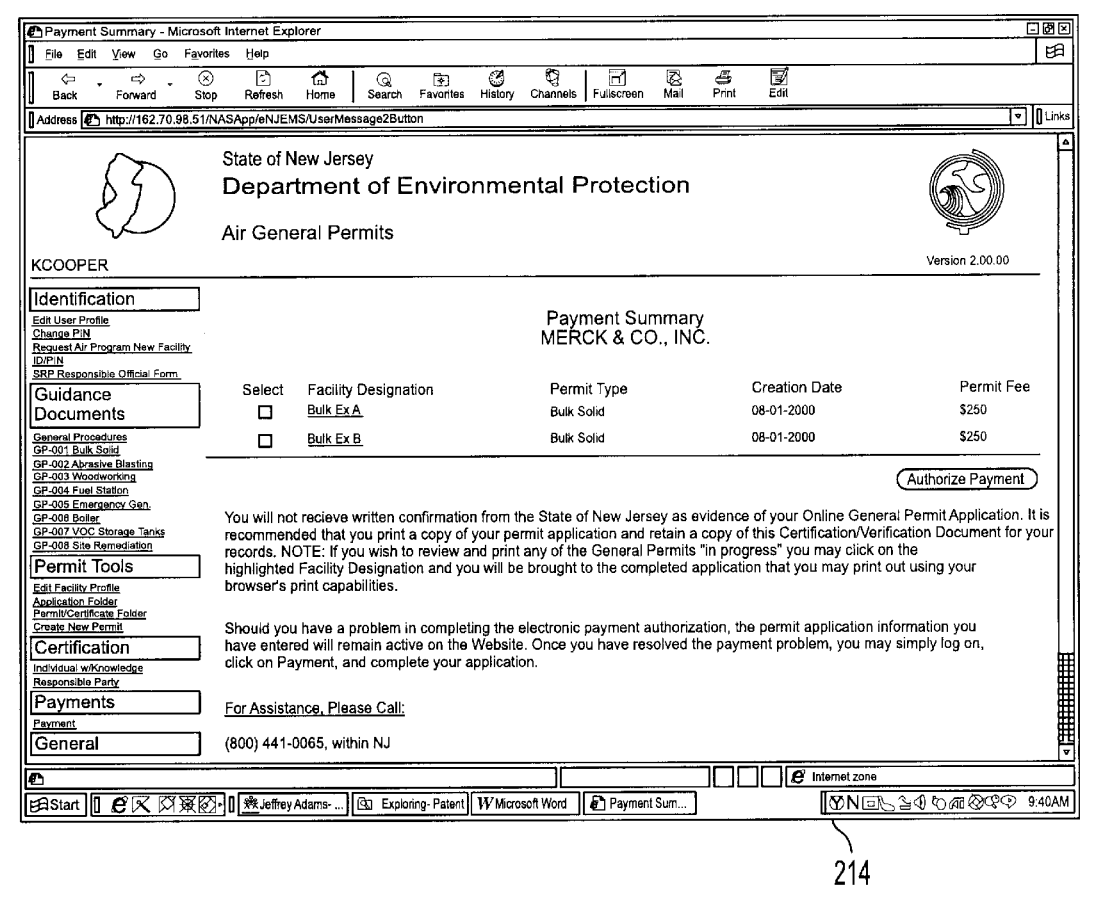
Figure 3G:
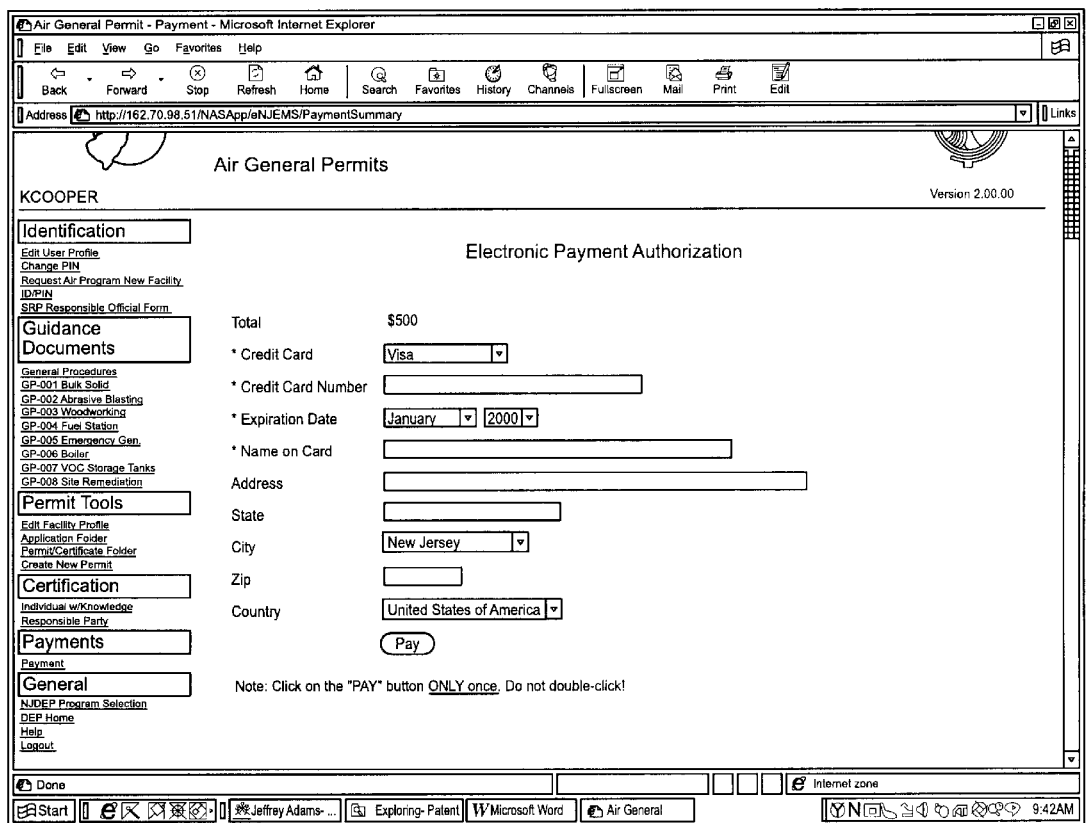

The system will also allow the user to pay the permit fees by giving the user the ability to select 148 the permit(s) to pay by activating 150 the payment button. The application 17, through the web server 14, presents 152 a payment summary screen 214 (see FIG. 3F). From this screen the user selects 154 the permit(s)for which fees will be paid and submits the selection. The system automatically calculates 155 the total payment amount by totaling the fees for each permit selected. Upon clicking the continue button the application 17 determines a total fee from the selected permits by accessing a fee list in the database 18 for the types of permits and the user is presented 156 with a payment authorization screen 216 (see FIG. 3G). The user enters 158 payment data, such as credit card number, and, when finished activates 160 the pay button of the screen which submits the payment data. The application then performs conventional operations to contact 162 a payment system 20, such as the CyberCash system previously mentioned, which validates 164 the payment information. For example, a user enters his/her credit card number, expiration date and name on card. This credit card information is transferred to the CyberCash system which validates this credit card information with a credit card processing company. If the user provides invalid credit card information the user is provided 168 a Java Script message and is allowed 170 to re-enter the credit card information. When the payment authorization information is verified 172, that is, upon successful completion checking of the credit information, the payment is charged 176 through the payment system 20, the returned authorization code and payment is credited 178 and 180 to the client account and the payment information is entered into the database 18. In addition at this point, although not shown, payments received for transactions processed through the web portal update the submittal record in the agency's general ledger system, such as the MOMENTUM FINANCIAL system available from AMS. The agency's enterprise wide environmental management system transfers a file to the state or federal general ledger system with all amounts and submittals paid and updated for that day. Each transaction will credit an associated revenue account, with the appropriate cross-references back to the posting transaction. The system will record the date, amount, and reason for the credit, as well as associated payment method information (i.e., credit card authorization number, or check number).

The system allows a user to edit an electronic submittal at any point prior to payment. For example, a user may access a permit off of the permit payment summary screen previously described and edit a permit through the previously described data entry screens. If a submittal is edited the submittal must be re-certified through the aforementioned certification process prior to payment.

Figure 4:
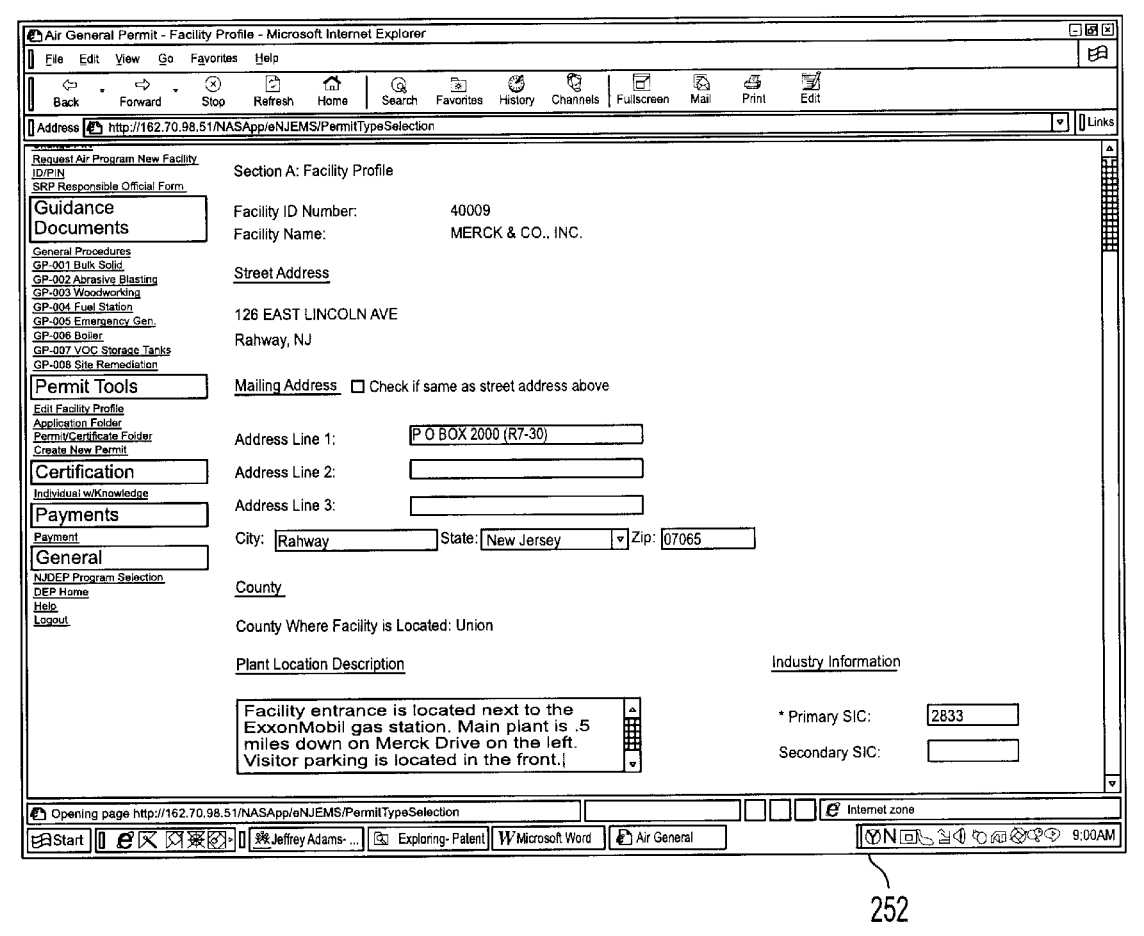

The system also allows a user to edit a facility profile using an edit screen 252, as shown in FIG. 4, and which can be selected directly from the screen menu previously discussed.

Figure 5B:
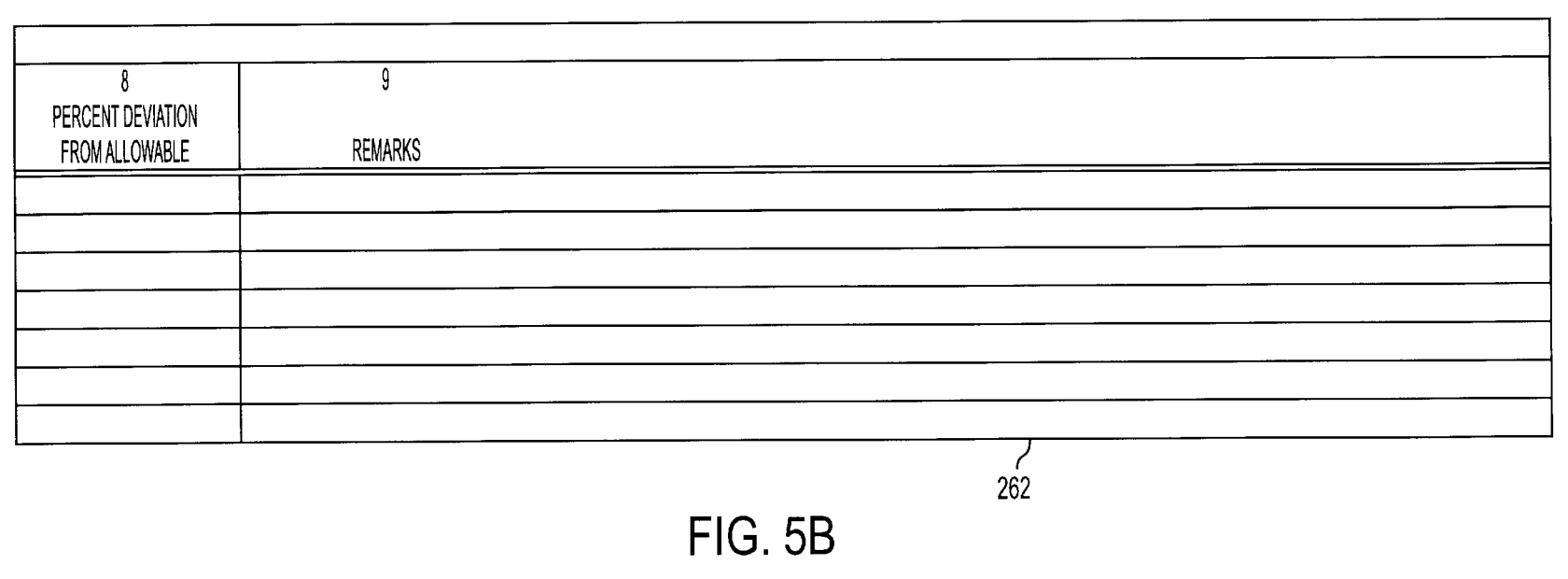
Figure 7B:
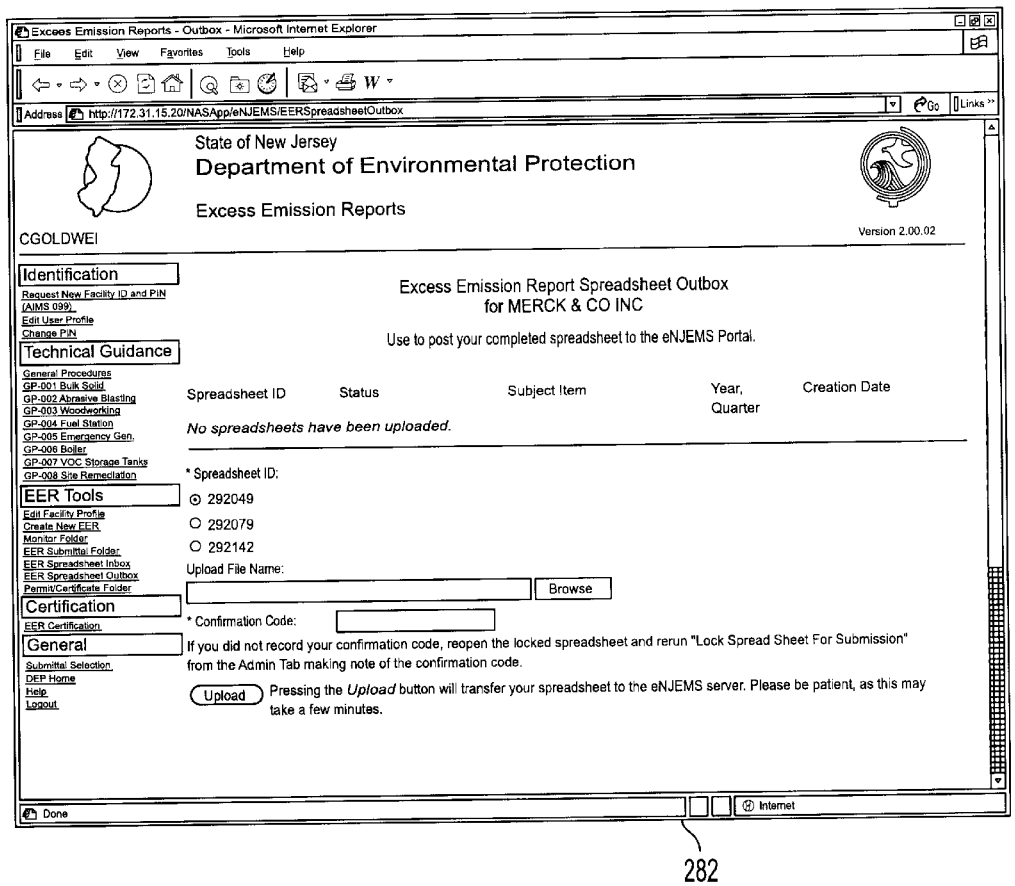
Figure 8:
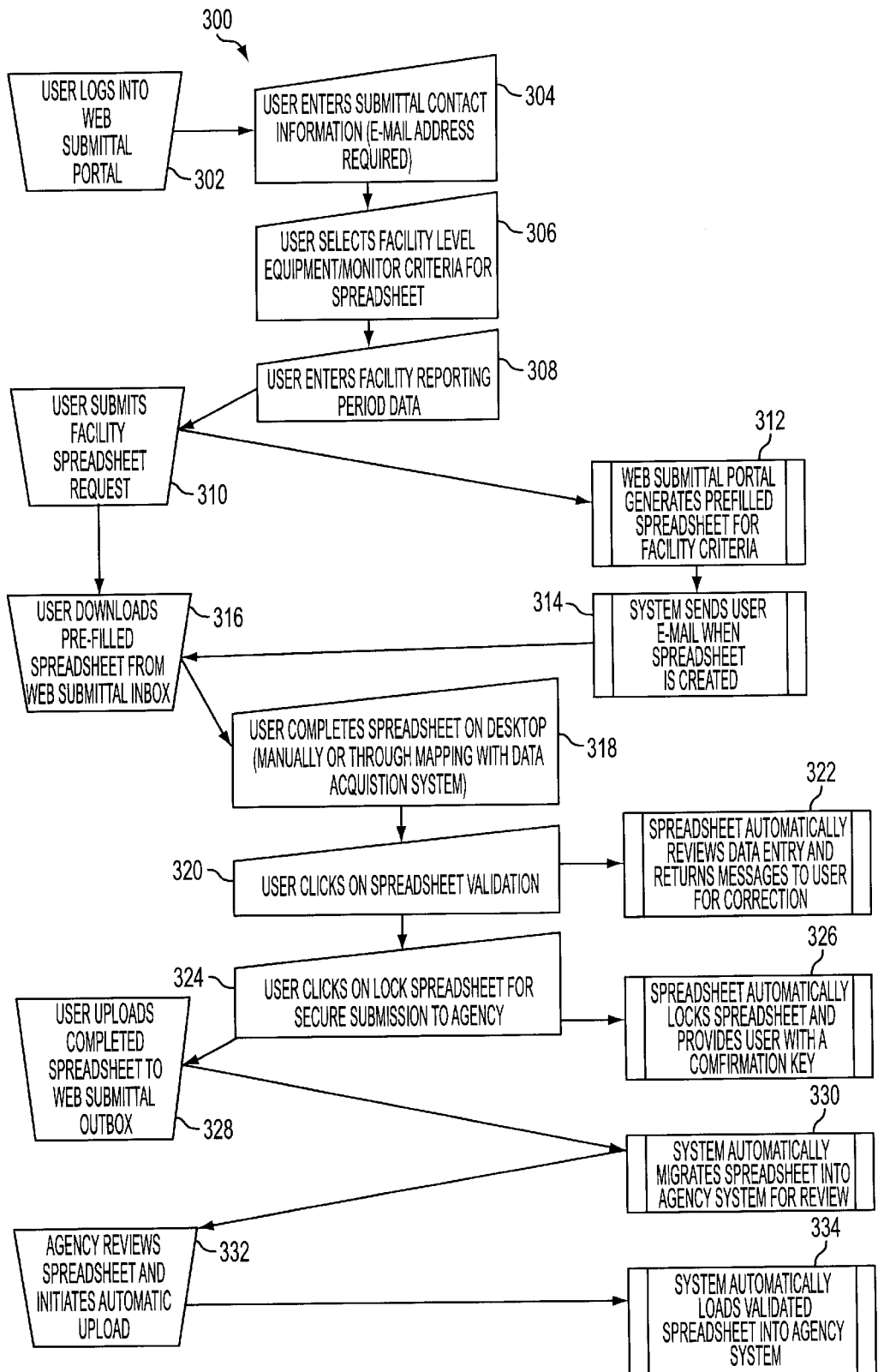
FIG. 8 depicts the flow of operations performed when requesting, downloading, completing, uploading and certifying an electronic file, such as a spread-sheet in support of an environmental submittal.

It is often the case that the permit process needs additional, more data intensive information that can be provided in the form of a supplemental electronic file, such as a spread-sheet. For example, a log of incidents where an emission has exceeded a permissible allowance, see FIGS. 5A and 5B for an example spread-sheet 262. The present invention allows for the downloading and uploading of such spread-sheets using web pages 272 and 282 as depicted in FIGS. 7A and 7B. The operations 300 involved in downloading, updating and uploading such spread-sheets are shown in FIG. 8.

Figure 6A:
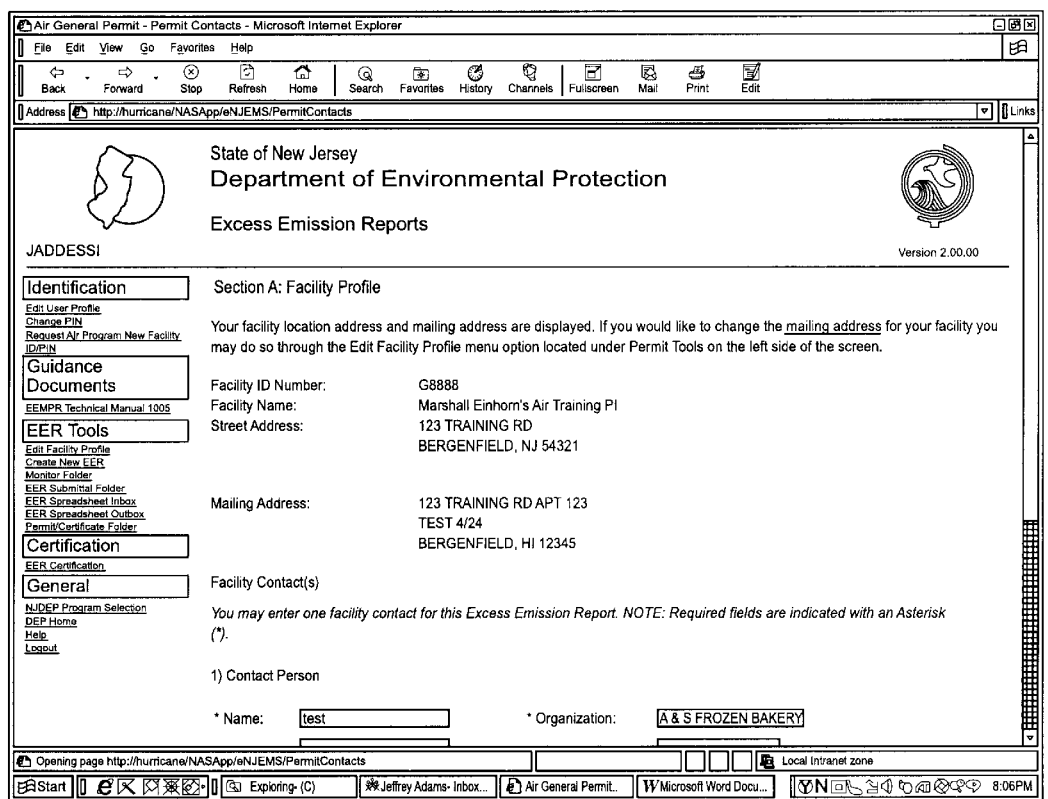
FIGS. 6Ai, 6Aii, 6Bi, 6Bii and 6C illustrate screens associated with a spread-sheet capable of being downloaded, completed or edited, and uploaded in another aspect of the present invention.
Figure 6:
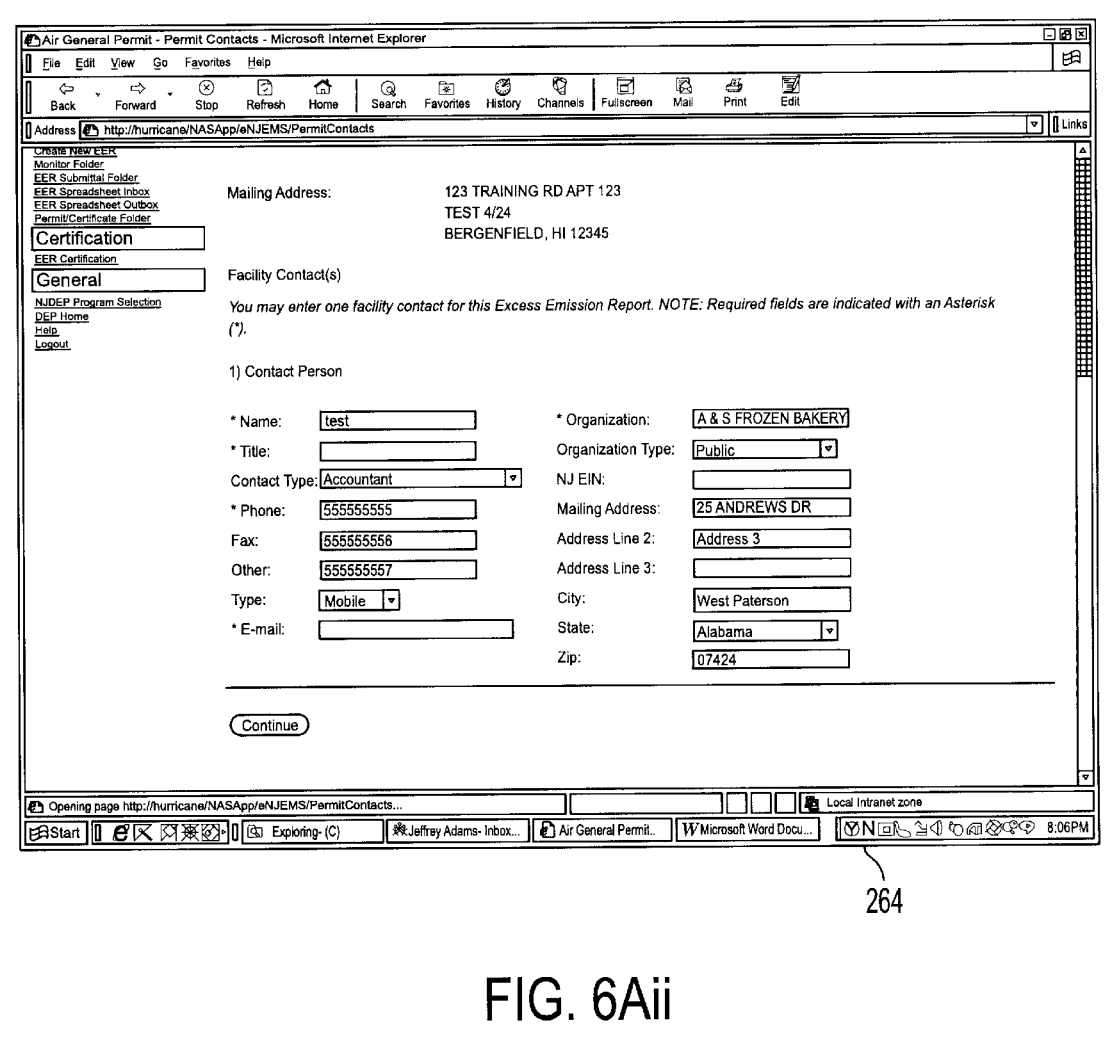
Figure 6B:
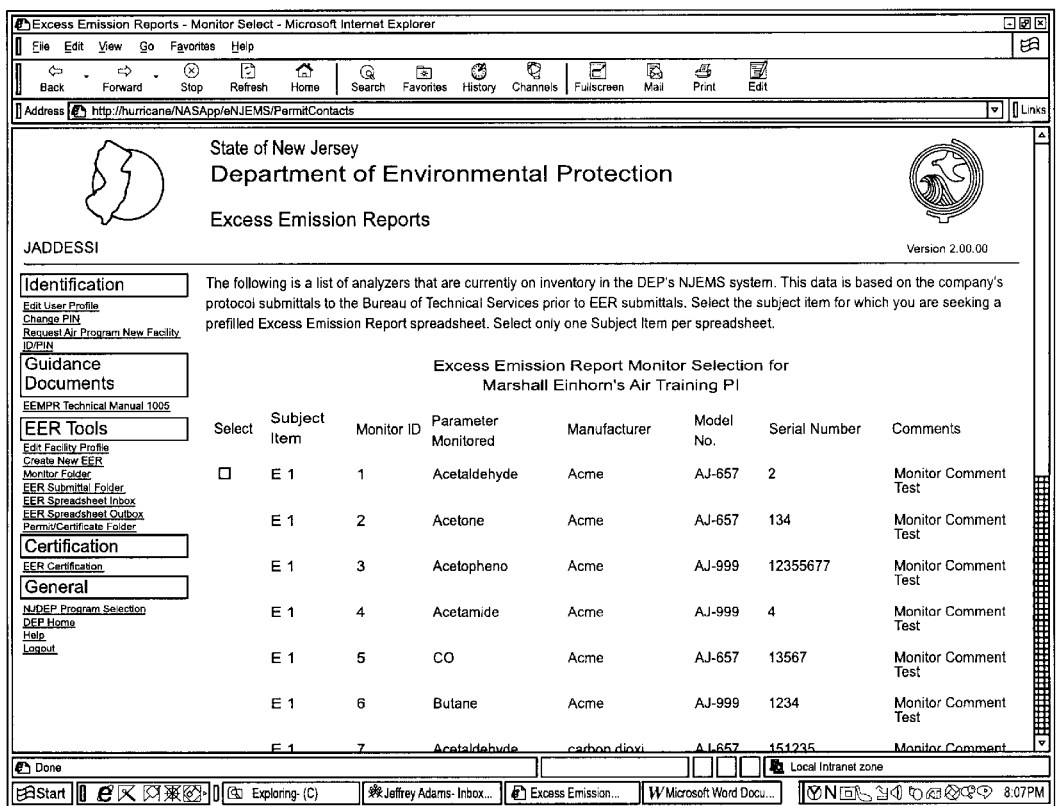
Figure 6C:
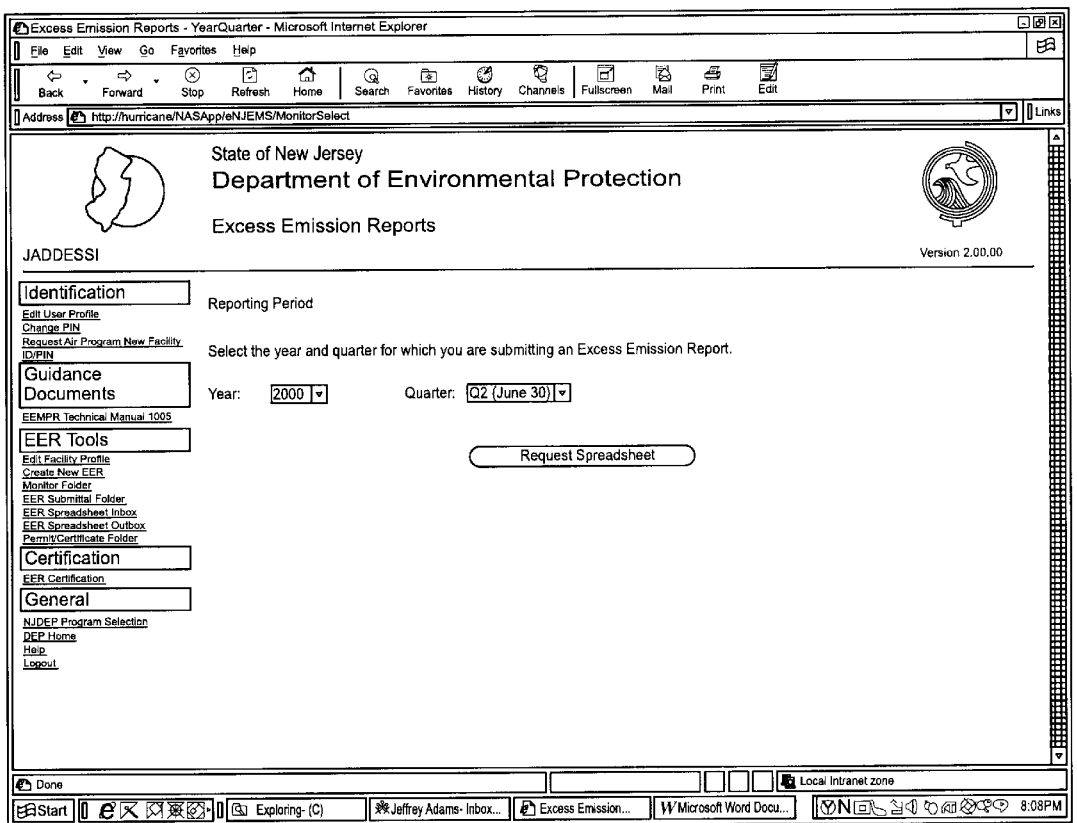

To begin a download of a spread-sheet that the user desires to update, the user accesses 302 (see FIG. 8) the spread-sheet submittal web pages (see FIGS. 6A–6C). In this page 264 the user enters 304 contact information, typically an address information including an e-mail address as depicted in FIGS. 6Ai and 6Aii, enters 306 facility and equipment identification information in page 266 as depicted in FIGS. 6Bi and 6Bii and enters 308 reporting period data in page 268 as depicted in FIG. 5C. The user then submits 310 the completed request to the application server 16 through the web server 14. Because the preparation of the spread-sheet can take a short period of time, the spread-sheet can be and typically is prepared at the server level and is "off-line" from the user's interaction taking place with the permitting system web site on the client machine. As a result, when the user submits the request, the user need not wait for the spread-sheet to be created and can do other things. Of course, it is also possible for the user to wait and refresh the application screens in real-time so that the user can have access to the spread sheet as soon as possible if desired. While the spread sheet is being prepared, the application server 16 accesses the database 18 in server 19 and generates 312 a pre-filled spread-sheet using the identifying information to obtain relevant data from the database 18. The application server 14 then sends 314 an e-mail message to the user indicating that the spread-sheet is completed and ready for down loading.

After the user recognizes that the spread-sheet is completed by reading the e-mail, the user logs back on to the system and opens 316 the download page (FIG. 7A) which lists the spread-sheets that are available for downloading. The user submits the down load request to the application server 16 by selecting the download button on the page and the spread-sheet is conventionally file transfer downloaded and opened. It is also possible for the spread sheet to be transferred to the user via e-mail.

The user updates 318 the pre-filled spread-sheet on his/her PC or mobile device. The advantage to this client level completion is secure data entry prior to submission for agency review. In addition, a user may distribute the supporting electronic file for completion by multiple users prior to uploading. Once the spread-sheet is completed a user requests 320 data validation. The validation of the spread-sheet insures that all required data is entered and that any data that does not meet regulatory standards is flagged as such. The user then initiates 324 a lock of the spread-sheet and the spread-sheet is automatically locked 326. The file is locked in a two-step process. The first step is that file is saved as a read-only file and the second step is that the file is locked with a unique, spread-sheet level code. This code is required for secure spread-sheet uploading onto the web portal.

Once the spread-sheet is locked, the user uses the up load page (see FIG. 7B) to submit 328 the spread-sheet to the application server 14 and the spread-sheet is transferred to the server 14 via a conventional file transfer. The application 14 migrates 330 the spread-sheet into an agency file review queue and an appropriate person the agency can open the file and review 332 the locked, read-only spread-sheet. Once the review is completed, the system loads 334 the updated sheet into the database.

An important feature of each screen is the menu on the left side. This menu provides the user with easy access to the screens most likely to be important to them, based upon facility and related individual security access stored in their user profile. This feature improves navigational capabilities and streamlines the use of the site for the user.

As described above, the tool of the present invention eliminates all manual administrative processing and paperwork by the regulating agency. With its built-in administrative checks, and the ability to submit securely directly into the regulated agency's enterprise-wise system, clients no longer must undergo a lengthy and burdensome paper-chase to provide the regulating agency with required data. Accessing enterprise information on-line gives clients the ability to update data quickly and frequently, thereby ensuring that facilities and agencies are always viewing current and accurate data, speeding up the approval process. Electronic certification and payment also drastically decrease turn-around time for approval by eliminating reliance on manual paper processing.

The present invention has been described with respect to environmental-streamlining the transfer of data and permit documents between regulators and their regulated clients as well as making payments therefor. The tool of the present invention could be applied to the creation, electronic certification, printing and payment of any kind of permit document (i.e. permit, application, report, certificate and/or standardized spread-sheet) for electronic submission and automated processing for any type of environmental, health and safety data for a facility. The on-line payment capability could also be applied to the payment of fees or penalties due to the enforcement actions of any regulatory agency or organization. In addition to the streamlining of the interface between industry and regulatory agencies the present invention could also be used on the Intranet for internal electronic submittals within an agency or within an industry client.

The present invention has been described as having the application server, etc. located at and under the control of the regulating entity. It is possible to have it located and under the control of others such as an independent entity sanctioned by the regulating entity.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A web portal system, comprising:
 a computer implemented agency environmental management system storing permit data and compliance information and automatically validating the permit data, wherein the permit data comprises requirements within which a process, piece of equipment, or a facility is operated and the compliance information are reports comprising information to verify compliance with the requirements; and a computer implemented remote access system couplable to the environmental system allowing a user remote access to obtain and comply with a permit and to at least one of create, edit, and print the permit within the environmental system.

2. A system as recited in claim 1, wherein the remote access system is coupled to the environmental system via a packet switched network.

3. A system as recited in claim 1, wherein the packet switched network comprises an Internet.

4. A system as recited in claim 1, wherein the remote access system user comprises a regulated entity and the environmental system is controlled by a regulating entity.

5. A system as recited in claim 1, wherein the remote access system comprises a desktop computer.

6. A system as recited in claim 5, wherein the remote access system comprises a web browser.

7. A system as recited in claim 1, wherein the environmental system pre-populates the permit with available data before presenting the permit to the user via the remote access system.

8. A system as recited in claim 1, wherein the user interacts with the environmental system in real-time, on-line during the one of creation or editing or printing.

9. A system as recited in claim 1, wherein the remote access system allows a user to digitally certify a permit within the environmental system.

10. A system as recited in claim 9, wherein the remote access system allows the user to obtain a unique digital signature from the environmental system and certify the permit using the signature.

11. A system as recited in claim 1, wherein the remote access system allows a user to electronically pay for a permit through the environmental system.

12. A system as recited in claim 11, wherein the environmental system is coupled to an electronic payment system.

13. A system as recited in claim 11, wherein an account within a general ledger of a regulating agency is updated with payment information regarding the electronic payment.

14. A system as recited in claim 1, wherein the remote access system allows a user to access permit status information concerning a permit within the environmental system.

15. A system as recited in claim 1, wherein the remote access system allows a user to update a supporting electronic file concerning one of a permit, survey, certificate, registration, questionnaire and report within the environmental system.

16. A system as recited in claim 15, wherein a regulator can access and use read-only data within a supporting electronic document including a spread-sheet.

17. A system as recited in claim 1, further comprising a central database repository of real-time permit data allowing browser independent Internet access from any remote access client machine.

18. A system as recited in claim 17, wherein a facility may register itself with the regulating entity for a first time.

19. A system as recited in claim 17, wherein the database comprises facility profile data.

20. A web portal system, comprising:

a computer implemented agency environmental management system storing one of permit, registration, and certificate information and automatically validating the permit information, wherein the permit information comprises requirements within which a process, piece of equipment, or a facility is operated; and a computer implemented remote access system couplable to said agency enterprise environmental management system allowing a user remote access to obtain and comply with the one of a permit, registration, and certificate and allowing the user to at least one of create, edit, and print the permit within the environmental management system.

21. A web portal system, comprising:

a computer implemented environmental management system storing authorization data for an authorization and automatically validating the authorization data, wherein the authorization data comprises requirements within which a process, piece of equipment, or a facility is operated; and a computer implemented remote access system couplable to the management system allowing a recipient of an authorization remote access to the authorization data and allowing the recipient to at least one of create, edit, and print the authorization within the environmental management system.

22. A system as recited in claim 21, wherein authorization data comprises one of permit/registration application data, registration data, questionnaire data, survey data, certificate data, sample measurement data, equipment data, maintenance data, location data, personnel data, compliance data, financial data, schedule data, education data, site data, emergency data, inspection data, checklist data and result data.

23. A web portal system, comprising:

a computer implemented agency environmental management system storing permit information and automatically validating the permit information, wherein the permit information comprises requirements within which a process, piece of equipment, or a facility is operated; and a computer implemented remote access system couplable to said agency enterprise environmental management system allowing a user remote access to submittal information and allowing the user to at least one of create, edit, and print a permit within the environmental management system.

24. A web portal system, comprising:

a computer implemented agency environmental management system storing permit information and automatically validating the permit information, wherein the permit information comprises requirements within which a process, piece of equipment, or a facility is operated; and a computer implemented remote access system couplable to said agency enterprise environmental management system allowing a user remote access to real-time facility-level data and allowing the user to at least one of create, edit, and print a permit within the environmental management system.

25. A web portal system, comprising:

a computer implemented agency environmental management system storing permit information and automatically validating the permit information, wherein the permit information comprises requirements within which a process, piece of equipment, or a facility is operated; and a computer implemented remote access system couplable to said agency enterprise environmental management system allowing a user remote access to and required online review of regulatory requirements and allowing the user to at least one of create, edit, and print a permit within the environmental management system.

26. An environmental permit web portal system, comprising:
   a computer implemented regulating agency environmental management system storing permit data and automatically validating the permit data, wherein said permit data comprises requirements within which a process, piece of equipment, or a facility is operated;
   a database comprising a central repository of real-time permit data, the database comprising facility profile data;
   a packet switched network; and
   a computer implemented remote access web portal desk top computer system having a web browser couplable to the environmental system via said packet switched network and allowing a regulated entity user remote access to, in real-time and on-line, submittal information, real-time facility-level data and regulatory requirements in the database, allowing the user to create, edit and print an environmental permit within the environmental system, the environmental system pre-populating the permit with available data before presenting the permit to the user via the remote access system, allowing the user to digitally certify the permit within the environmental system, allowing the user to electronically pay for the permit through the environmental system, and allowing the user to update a supporting electronic file concerning the permit.

27. A process, comprising:
   contacting a computer implemented environmental permitting system using a web browser;
   accessing environmental permit information within the environmental permitting system using the web browser;
   automatically validating the permit information, wherein the permit information comprises requirements within which a process, piece of equipment, or a facility is operated; and
   creating, editing, and/or printing a permit within the environmental permitting system.

28. A process as recited in claim 27, further comprising allowing a user to create, edit and print a permit within the environmental system.

29. A process as recited in claim 27, further comprising pre-populating the permit with available data before presenting the permit to the user via the remote access system.

30. A process as recited in claim 27, further comprising automatically validating permit data.

31. A process as recited in claim 27, further comprising updating an account within a general ledger of a regulating agency with payment information regarding the electronic payment.

32. A process as recited in claim 27, further comprising allowing a user to update a supporting electronic file concerning one of a permit, survey, certificate, registration, questionnaire and report within the environmental system.

33. A process as recited in claim 27, further comprising allowing a user to electronically pay for a permit through the environmental system.

34. A process as recited in claim 27, further comprising allowing a user to validate, electronically lock and upload a read-only supporting electronic file.

35. A process as recited in claim 27, further comprising allowing a user to certify and pay for one or more environmental submittals at a time.

36. A process as recited in claim 27, further comprising allowing a user to create, select, edit, print, complete, certify and pay for initial, modified and renewed environmental permits, reports, registrations, questionnaires, surveys, certificates and applications.

37. A process as recited in claim 27, further comprising allowing a user secure access and certification of facility-level and user-specific data through the automated administration of unique user identifications and encrypted personal identification numbers.

38. A process, comprising:
   contacting a computer implemented environmental permitting system using a web browser;
   registering a facility with a regulating organization for a first time;
   accessing environmental permit information comprising facility data of the facility within the environmental permitting system using the web browser;
   automatically validating the permit information; and
   creating, editing, and/or printing a permit within the environmental permitting system.

39. A process of a web portal system, comprising:
   connecting with a computer implemented environmental permitting system;
   electronically communicating environmental compliance management information for a permit and automatically validating the compliance management information, wherein the compliance management information are reports comprising information to verity compliance with permit requirements within which a process, piece of equipment, or a facility is operated; and
   creating, editing, and/or printing the permit within the environmental permitting system.

40. A computer readable storage storing a program controlling a computer by allowing contacting of a computer implemented environmental permitting system using a web browser, accessing environmental permit information within the environmental permitting system using the web browser, automatically validating the permit information, and creating, editing, and/or printing a permit within the environmental permitting system, wherein said permit information comprises requirements within which a process, piece of equipment or a facility is operated.

41. A graphical user interface comprising an electronic hypertext environmental permitting screen allowing a user to control a computer by allowing contacting of a computer implemented environmental permitting system using a web browser, to access environmental permit information within the environmental permitting system using the web browser, to automatically validate the permit information, and to create, edit, and/or print a permit within the environmental permitting system.

42. A web portal system, comprising:
   a computer implemented agency environmental management system storing permit information and automatically validating the permit information; and
   a computer implemented remote access system couplable to said agency enterprise environmental management system via a packet switched network to allow a user remote access to the stored permit information to obtain and comply with a permit by reporting data at specified times as specified by the permit and to allow the user to one of create, edit, and print the permit within the agency environmental management system, wherein compliance is obtained when the reporting data meets requirements specified by the permit.

43. An environmental permit web portal system, comprising:
   a computer implemented environmental management system stoaring permit data and automatically validating the permit data;
   a database comprising a central repository of real-time permit data;
   an application server; and
   a computer implemented remote access web portal allowing a user to create a permit and allowing the user to one of edit and print the permit within the environmental management system, wherein the application server retrieves from the database a list of valid permit types and provides the remote access web portal with a screen allowing the user to select the type of permit and to submit data required for the type of permit selected.

44. The system as recited in claim 43, wherein the environmental management system automatically validates information submitted for the type of permit selected and flags for the user the data that does not meet regulatory standards.

45. The system as recited in claim 43, wherein the environmental management system pre-populates the permit with available data before presenting the permit to the user via the remote access system, allows the user to electronically pay for the permit through the environmental system, and allows the user to update a supporting electronic file concerning the permit.

46. A method of a web portal system, comprising:
   storing permit data identifying permit information associated with regulated entities/facilities and identifying other regulatory information comprising ID information, facility related information and supporting electronic documentation;
   automatically validating the permit data;
   allowing an authorized regulated entity to access the permit data by displaying permit requirements for all permits associated with the regulated entity;
   allowing the regulated entity to select permit data from the permit requirements; and
   generating a permit based on the permit data selected, wherein the method generates one of a permit, reports, registrations, questionnaires, surveys, certificates, applications, electronic files, provides access to real-time facility-level and/or user-specific regulatory data, and allows to one of edit and print the permit.

47. The system as recited in claim 46, further comprising allowing a user to provide additional information in a form of a supplemental electronic file to the environmental permitting system.

48. A web portal system, comprising;
   a computer implemented environmental management system storing environmental information and automatically validating the environmental information;
   a database comprising a central repository of real-time data; and
   a computer implemented remote access web portal system couplable to the environmental management system allowing a regulated entity remote access to real-time facility-level data and information submittal, in real-time and on-line, and allowing the regulated entity to create, edit, and print an environmental application or an environmental license within the environment management system.

49. The system as recited in claim 48, wherein the remote access web portal system allows the regulated entity to update a supporting electronic file concerning the environmental application or the environmental license.

50. A computer implemented environmental permit web portal system reducing manual administrative processing and paperwork by a regulating agency, comprising:
   a database comprising a central repository storing data for the regulating agency and permit information; and
   a computer implemented remote access system couplable to the database allowing the regulating agency remote access to the date and to obtain and comply with a permit and allowing the regulating agency to one of create, edit, and print the permit, wherein the system automatically validates the permit information.

51. The system as recited in claim 50, wherein the remote access system automatically sends the regulating agency automated electronic messaging providing proactive environmental compliance communication and management, the automated electronic messaging comprising upcoming key expiration dates, renewal fees, renewal instructions, and reminders indicating when the regulating agency has failed to submit supporting documents.

52. The system as recited in claim 50, wherein the remote access system provides a customized spread-sheet for a user on demand and provides facility-level monitor and equipment data that is up-to-date.

53. The system as recited in claim 50, wherein the remote access system allows a user remote access to creation, electronic certification, printing and payment of at least one of the permit, an application, a report, a certificate and/or a standardized spread-sheet for electronic submission and automated processing for any type of environmental, health and safety data for a facility, and payment of fees or penalties due to enforcement actions of a regulatory agency or organization.

54. The system as recited in claim 50, wherein the remote access system automatically sends an electronic message to a user with upcoming key expiration dates, renewal fees, renewal instruction, and a reminder indicating failure to submit mandated supporting documents and allows the user to access permit status information concerning the permit within the regulating management system.

* * * * *